(12) United States Patent　　(10) Patent No.: US 12,014,456 B2
Fielding et al.　　(45) Date of Patent: Jun. 18, 2024

(54) RAY TRACING GRAPHICS PROCESSING SYSTEMS

(71) Applicant: Arm Limited, Cambridge (GB)

(72) Inventors: Edvard Fielding, Trondheim (NO); Carmelo Giliberto, Trondheim (NO)

(73) Assignee: Arm Limited, Cambridge (GB)

( * ) Notice: Subject to any disclaimer, the term of this patent is extended or adjusted under 35 U.S.C. 154(b) by 109 days.

(21) Appl. No.: 17/814,387

(22) Filed: Jul. 22, 2022

(65) Prior Publication Data

US 2023/0043630 A1　　Feb. 9, 2023

(30) Foreign Application Priority Data

Jul. 29, 2021 (GB) ...................................... 2110957

(51) Int. Cl.
*G06T 15/06* (2011.01)
*G06T 1/20* (2006.01)
*G06T 15/00* (2011.01)
*G06T 15/04* (2011.01)
*G06T 17/10* (2006.01)

(52) U.S. Cl.
CPC ............ *G06T 15/06* (2013.01); *G06T 1/20* (2013.01); *G06T 15/005* (2013.01); *G06T 15/04* (2013.01); *G06T 17/10* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 2016/0110910 A1* | 4/2016 | Obert | G06T 15/005 345/426 |
| 2019/0197761 A1 | 6/2019 | Saleh et al. | |
| 2020/0051318 A1* | 2/2020 | Muthler | G06N 3/045 |

FOREIGN PATENT DOCUMENTS

WO　　2016060874 A1　　4/2016

OTHER PUBLICATIONS

Combined Search Report and Examination Report under Sections 17 and 18(3) dated Dec. 7, 2021, GB Patent Application No. GB2110957.4.

* cited by examiner

*Primary Examiner* — Edward Martello
(74) *Attorney, Agent, or Firm* — Vierra Magen Marcus LLP

(57) ABSTRACT

A method of operating a graphics processor when rendering a frame representing a view of a scene using a ray tracing process in which part of the processing for a ray tracing operation is offloaded to a texture mapper unit of the graphics processor. Thus, when the graphics processor's execution unit is executing a program to perform a ray tracing operation the execution unit is able to message the texture mapper unit to perform one or more processing operations for the ray tracing operation. This operation can be triggered by including an appropriate instruction to message the texture mapper unit within the ray tracing program.

11 Claims, 11 Drawing Sheets

RAY TRACING GRAPHICS PROCESSING SYSTEMS

CROSS-REFERENCE TO RELATED APPLICATIONS

This application claims priority pursuant to 35 U.S.C. 119(a) to United Kingdom Patent Application No. 2110957.4, filed Jul. 29, 2021, which application is incorporated herein by reference in its entirety.

BACKGROUND

The technology described herein relates to graphics processing systems, and in particular to the rendering of frames (images) for display.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value, e.g., sampling point in the image, is determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

Ray tracing is considered to provide better, e.g. more realistic, physically accurate images than, e.g., rasterisation-based rendering techniques, particularly in terms of the ability to capture reflection, refraction, shadows and lighting effects. However, ray tracing can be significantly more processing-intensive than rasterisation.

The Applicants believe that there remains scope for improved techniques for performing ray tracing using a graphics processor.

BRIEF DESCRIPTION OF DRAWINGS

Embodiments of the technology described herein will now be described by way of example only and with reference to the accompanying drawings, in which.

Like reference numerals are used for like elements in the Figures where appropriate.

DESCRIPTION

Figure 1:
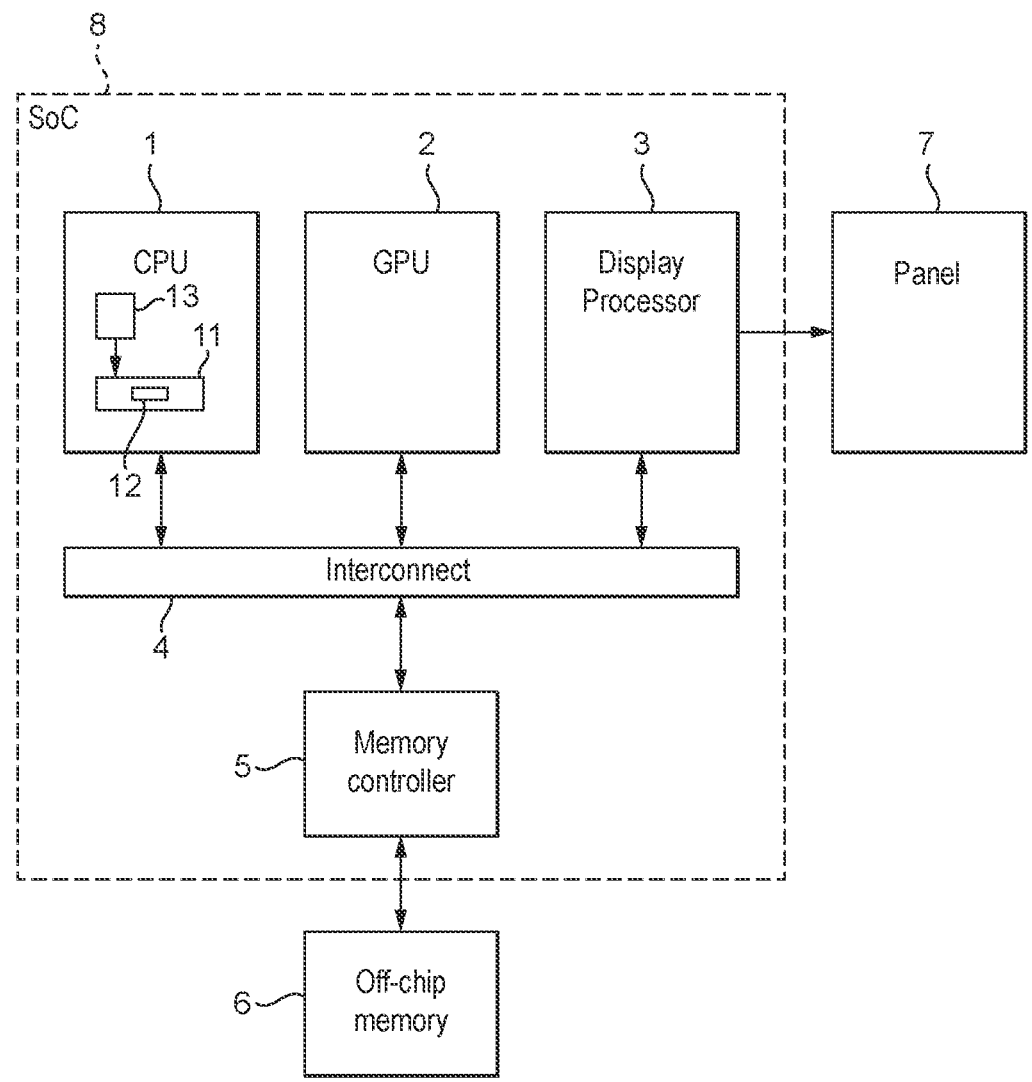
FIG. 1 shows an exemplary graphics processing system.

A first embodiment of the technology described herein comprises a method of operating a graphics processor when rendering a frame representing a view of a scene using a ray tracing process, the graphics processor comprising:

a programmable execution unit operable to execute programs to perform graphics processing operations; and a texture mapper unit operable to perform graphics texturing operations in response to requests for graphics texturing operations from the programmable execution unit;

the method comprising:

when the programmable execution unit is executing a program to perform a ray tracing operation that uses a ray tracing acceleration data structure indicative of the distribution of geometry for a scene to be rendered to determine geometry for a scene to be rendered that may be intersected by a ray being used for the ray tracing operation:

the programmable execution unit messaging the texture mapper unit as part of the ray tracing operation that uses the ray tracing acceleration data to cause the texture mapper unit to perform one or more processing operations for the ray tracing operation, with a result of the one or more processing operations being returned to the programmable execution unit.

A second embodiment of the technology described herein comprises a graphics processor operable to render a frame representing a view of a scene using a ray tracing process, the graphics processor comprising:

a programmable execution unit operable to execute graphics processing programs to perform graphics processing operations; and a texture mapper unit operable to perform graphics texturing operations in response to requests for graphics texturing operations from the programmable execution unit;

wherein:

the programmable execution unit is operable and configured to, when the programmable execution unit is executing a program to perform a ray tracing operation that uses a ray tracing acceleration data structure indicative of the distribution of geometry for a scene to be rendered to determine geometry for a scene to be rendered that may be intersected by a ray being used for the ray tracing operation, message the texture mapper unit as part of the ray tracing operation that uses the ray tracing acceleration data structure to cause the texture mapper unit to perform one or more processing operations for the ray tracing operation, with a result of the one or more processing operations being returned to the programmable execution unit.

The technology described herein relates to the performing of ray tracing on a graphics processor. In the technology described herein, as will be explained further below, the ray tracing process uses an acceleration data structure, such as a bounding volume hierarchy, representative of geometry in the scene that is to be rendered to determine the intersection of rays with geometry (e.g. objects) in the scene being rendered. The ray tracing process thus in an embodiment involves traversing the ray tracing acceleration data structure to determine for a ray being used for the ray tracing operation which nodes of the acceleration data structure represent geometry that is potentially intersected by the ray (if any).

This traversal operation basically involves traversing the ray tracing acceleration data structure and testing rays for intersection with the volumes associated with the respective nodes of the ray tracing acceleration data structure (ray-volume testing), to determine which node volumes are intersected by which rays, e.g. to determine which nodes should therefore be tested next for the ray, and so on, down to the end nodes, e.g., at the lowest level, of the ray tracing acceleration data structure. The result of this is therefore to identify which end nodes (end node volumes) contain geometry that is potentially intersected by the ray. For any end nodes that it is determined represent geometry that may be intersected by the ray, it is then determined which (if any) geometry represented by the end nodes is actually intersected.

Thus, once it has been determined which, if any, end nodes represent geometry that may be intersected by the ray (by performing such ray-volume intersection testing for respective nodes of the ray tracing acceleration data structure), the actual geometry intersections for the ray for the geometry that occupies the volumes associated with the intersected end nodes can be determined accordingly, e.g. by testing the ray for intersection with the individual units of geometry (e.g. primitives) defined for the scene that occupy the volumes associated with the end nodes (ray-primitive testing).

This ray-primitive testing may be performed as part of the same overall traversal operation as the ray-volume testing, such that the traversal operation comprises both the initial traversal of the ray tracing acceleration data structure to determine which end nodes represent geometry that is potentially intersected by the ray and the subsequent determinations of which geometry is actually intersected by the ray (if any). In that case, an end node is in an embodiment submitted for ray-primitive testing by itself, e.g. such that all of the primitives represented by the end node (and only that end node) are in an embodiment tested in one instance. However, this need not be the case, and the ray-primitive testing may be performed in a subsequent, separate step to the traversal operation. In that case, the primitives that are to be tested may be submitted for testing in any fashion, as desired. For example, as part of the overall operation that uses the ray tracing acceleration data structure to determine (with reference to the end nodes) geometry that may be intersected by a ray being used for the ray tracing operation, primitives that are represented by multiple different end nodes may be submitted for ray-primitive testing in one instance. Various arrangements would be possible in this regard.

The ray tracing operation thus in an embodiment involves performing such ray-volume and ray-primitive intersection testing (generally 'ray-node' intersection testing) for a ray to determine geometry intersections for the ray. Once the geometry intersections for the rays being used to render a sampling position have been determined, the ray tracing operation then renders sampling positions in the output rendered frame representing the scene accordingly.

Thus, in embodiments, the ray tracing operation that is being performed comprises a ray tracing traversal operation that comprises traversing the ray tracing acceleration data structure, e.g. as described above. In that case, the programmable execution unit in an embodiment messages (is caused to message) the texture mapper unit as part of the ray tracing traversal operation. The ray tracing operation may however relate to any part of the overall ray tracing operation that uses the ray tracing acceleration data structure to determine geometry that may (or is) intersected by a ray being used for the ray tracing operation. For instance, the programmable execution unit may message the texture mapper unit during the initial traversal, e.g. when it is desired to perform ray-volume testing in respect of a particular node. However, the programmable execution unit may also or alternatively message the texture mapper unit during the subsequent determination of the actual geometry intersections, e.g. when it is desired to perform ray-primitive testing in respect of the primitives represented by a particular end node or nodes of the ray tracing acceleration data structure.

In the technology described herein, the ray tracing process is performed by the graphics processor executing an appropriate program or programs for the ray tracing process. The graphics processor thus includes a programmable execution unit that is operable to execute such programs. For instance, a program can be executed by respective execution threads of the programmable execution unit, with individual execution threads corresponding, e.g., to one ray being used for the ray tracing process. In embodiments, plural execution threads may also be grouped together into execution thread groups (or "warps") to improve shader program execution efficiency, e.g. with threads in a group being run in lockstep, e.g. one instruction at a time.

It is common in graphics processing systems to generate appearances for sampling positions in the output rendered frame representing the scene by applying so-called "textures" or texture data to the surfaces to be drawn. Such textures are typically applied by storing an array of texture elements or "texels", each representing given texture data (such as colour, luminance and/or light/shadow, etc. values), and then mapping the texels onto the corresponding elements, such as (and, indeed, typically) a set of sampling positions for the render output in question.

To facilitate this, the graphics processor in the technology described herein further includes a texture mapper unit operable to perform graphics texturing operations in response to requests for graphics texturing operations from the programmable execution unit, e.g. when rendering the sampling positions. A given shader program to be executed by the programmable execution unit may therefore include texturing instructions for texture mapping operations that are required to be executed by the texture mapper unit (hardware/circuit), e.g. in the normal way for a texture mapper unit within a graphics processor.

In the technology described herein, the ray tracing process is thus performed by the programmable execution unit of the graphics processor executing one or more graphics processing program to perform the ray tracing operation, as mentioned above. However, during the ray tracing operation, and in embodiments as part of the traversal operation in which the ray tracing acceleration data structure is traversed to determine the geometry that could be intersected by a ray that is being used to render a sampling position in the frame, the programmable execution unit triggers the texture mapper unit to perform one or more processing operations for the ray tracing operation.

In other words, rather than the programmable execution unit performing the full ray tracing operation, some of the processing operations for the ray tracing operation can be (and are) offloaded to the texture mapper unit.

The programmable execution unit is thus operable and configured to message the texture mapper unit to cause the texture mapper unit to perform the desired one or more processing operations for the ray tracing operation (or operations) as and when required. The texture mapper unit then performs the required processing operations accordingly and returns a result of the processing operations to the programmable execution unit for use by the program for the ray tracing operation.

In the technology described herein, the texture mapper unit (hardware/circuit) is thereby effectively re-purposed to act as an accelerator for the ray tracing operation.

This then has the effect of performing some of the ray tracing operation using the texture mapper unit (hardware/circuit), rather than, e.g., performing the full operation using more general programmable processing circuitry that is programmed to perform the required operation (and without providing dedicated ray tracing hardware that is completely separate and in addition to the existing texture mapper unit, thus reducing the additional silicon area that might otherwise be required).

Accordingly, rather than the programmable execution unit performing the full ray tracing operation, including traversing an acceleration data structure to determine geometry that could be intersected by a ray and then determining whether any geometry is actually intersected by the ray, the programmable execution unit offloads some of that processing, and in particular in an embodiment offloads at least part of the operation of traversing the ray tracing acceleration data structure to determine geometry that could be intersected by a ray, to the texture mapper unit, which texture mapper unit then returns an associated result to the programmable execution unit for further use during the ray tracing operation.

As will be discussed further below, the Applicants have recognised in this regard that the texture mapper unit (hardware/circuit) may already be generally operable and configured to efficiently handle data structures (e.g. when performing normal texturing operations) that are similar to those that may be required during the ray tracing (e.g. traversal) operation.

For instance, when a texturing operation is encountered by a graphics processing shader program, a texturing instruction is typically sent from the programmable execution unit to the texture mapper, requesting the texture mapper to perform the texturing operation. The request, e.g. instruction, to the texture mapper for the texture mapping operation in an embodiment indicates one or more arrays of texture data values or "surfaces" (e.g. textures or "mip-maps") with which the texture mapping operation should be performed.

The instructions for the texture mapping operation may, for example, indicate (e.g. using a set of coordinates) a sampling position or positions in respect of which the texture mapping operation should be performed.

Thus, in embodiments, a request (instruction) to perform a texture mapping operation may indicate one or more input parameters (texturing operation settings (control data)), that define (aspects of) the texturing operation to be performed. The input parameters may be indicated using one or more descriptors. The one or more descriptors may be contained in the instruction and/or may be stored (e.g. in memory). The storage (e.g. memory) used to store the one or more descriptors may be the same memory or may be a different memory to that which stores the texture data values. The texture mapper may be operable to fetch, and may fetch, the descriptors and/or input parameters required to perform a texture mapping operation, e.g. from memory, in response to a request to perform a texture mapping operation.

The descriptors may take any desired and suitable form. For example, a descriptor may comprise a "texture descriptor", that may indicate one or more "surface descriptors" for the texture mapping operation. A surface descriptor may indicate and/or describe an array of texture data values or surface (a texture(s)) with which the texture mapping operation should be performed. The descriptors may further comprise a sampler descriptor indicating parameters (settings) to be used for the texture mapping operation.

When instructed to perform a texturing operation, the texture mapper unit then reads the required textures from memory, performs a texture mapping (e.g. filtering) operation, and returns a (e.g. RGB) colour sampled from the texture back to the shader program, for use when shading the fragment and sampling position(s) in question.

Correspondingly, a ray tracing operation is typically performed for a ray (or group of rays), with an individual ray being defined in terms of its origin, direction and length. This information can thus be indicated to the texture mapper unit as part of a message (instruction) sent from the programmable execution unit to the texture mapper in a similar way as the texturing information would be indicated when performing a texturing operation, e.g. by providing a new instruction that indicates the ray parameters (e.g. using a set of coordinates defining the ray's origin and direction, e.g. in x, y, z space, together with a value indicating the ray's length).

Thus, in embodiments, when the programmable execution unit is caused to message the texture mapping unit to perform one or more processing operations for a ray tracing operation being performed for a ray, the message (e.g. instruction) sent from the programmable execution unit to the texture mapper indicates a set of parameters (e.g. coordinates) defining the ray in question.

In an embodiment the message (instruction) also indicates a node of the ray tracing acceleration data structure in respect of which the processing operations are to be performed. For instance, this may be done by indicating in the message (instruction) a node index, e.g. representing an offset from a base node address for the ray tracing acceleration data structure in question.

A descriptor of the ray tracing acceleration data structure that is being used for the ray tracing operation can also be indicated for the message (instruction) in a similar fashion as the descriptors for the texture data, e.g. in a suitable header for the message, and thus handled in the same way.

For instance, a descriptor can be built for the ray tracing acceleration data structure to indicate, e.g. the base address for the ray tracing acceleration data structure from which the nodes indicated in the message (request) are indexed. The descriptor can thus be indicated to and fetched by the texture mapper in an analogous fashion as the texturing/sampler descriptors would be obtained during normal texturing operations, and used with the node index to determine the node in question.

The required data for the ray tracing operation in question (which depending on which part of the ray tracing operation is being offloaded to the texture mapping unit may, e.g., comprise a set of child node volumes associated with a node to be tested for the ray, and/or a set of primitives represented by the node, depending on the node in question and whether it is a parent or end node, etc.) can then be loaded in from memory accordingly via the texture mapping unit's memory interface in an analogous manner as texture data would be read in when performing a texturing operation. For instance, in an embodiment the processing operations are performed in respect of a node of the acceleration data structure and the node data is read in via a cache system of the texture mapper unit.

Thus, in embodiments, in response to the programmable execution unit messaging the texture mapping unit to perform one or more processing operations in respect of a node of the acceleration data structure, the texture mapper unit is configured to load in data for the node from memory.

The Applicants have thus recognised that the texture mapper unit is already able to handle such requests (instructions), which are suitable for providing indications of the ray parameters.

Similarly, the texture mapper unit is able to handle high throughput of such requests, as the texture mapper unit will typically (and in an embodiment) be provided with appropriate circuitry (such as a "parking" buffer, as will be explained below) to facilitate handling a large number of texturing requests during normal texturing operations, which circuitry is thus available to also be used for requests for processing operations during a ray tracing operation in a corresponding manner.

The texture mapper may also comprise other circuitry that may be useful for the ray tracing traversal operation, such as a miss-path subsystem and/or compression circuitry which may be useful for dealing with compressed node data, that can also be accessed for the ray tracing traversal operation using a single instruction. The re-utilisation of the texture mapper in this way may therefore be more efficient than trying to perform such operations elsewhere in the graphics processor.

The ray tracing operation(s) offloaded to the texture mapper may in general be any suitable and desired processing operations.

In an embodiment the processing operations that are offloaded to the texture mapper unit are processing operations that are to be performed in respect of an individual node of the ray tracing acceleration data structure during a ray tracing traversal operation.

For instance, and in embodiments, the programmable execution unit is configured to message the texture mapper unit to cause the texture mapper unit to load in the required data for testing a ray that is being used for the ray tracing operation for intersection with a given, individual node of the ray tracing acceleration data structure. Thus, in embodiments, the programmable execution unit offloads such load operations to the texture mapper, e.g. rather than attempting to load in such node data using more general purpose load/store circuitry on the graphics processor. This may be more efficient since the texture mapper is already configured to load in similar data, as discussed above.

In that case the texture mapper unit may then also perform (at least some of) the required intersection testing between the ray and one or more volumes associated with the node in question to determine whether the node contains geometry that is potentially intersected by the ray in question, with a result of the intersection testing then being returned to the programmable execution unit accordingly (and in particular for the programmable execution unit to then determine any geometry that is actually intersected by the ray and then render the sampling positions accordingly).

Thus, in embodiments, individual nodes of the ray tracing acceleration data structure represent one or more volumes within the scene, and wherein the traversal of the ray tracing acceleration data structure for a ray being used for the ray tracing operation comprises testing the ray for intersection with respective volumes associated with one or more nodes of the ray tracing acceleration data structure, the method comprises (and the graphics processor is configured such that): in response to the traversal operation requiring a ray to be tested for intersection with a volume (or set of volumes) associated with a given node of the ray tracing acceleration data structure, the programmable execution unit messaging the texture mapper unit to cause the texture mapper unit to load the data required for the intersection testing for the node in question.

The data that is loaded in using the texture mapper unit may then depend on the node in question. For instance, for a parent node that is encountered during a ray traversal operation, the data that is loaded in may be, and in an embodiment is, a set of (child) volumes (boxes) associated with the node in question that is to be used for the ray-volume intersection testing described above.

In embodiments, the texture mapper is further configured to test the ray for intersection with the node in question. For instance, when the node is a parent node, the texture mapper is in some embodiments further caused to test the ray for intersection with the volume (or volumes) associated with the node in question. The result that is returned by the texture mapper may thus comprise an indication as to whether or not the ray intersects the node (volume) being tested.

In that case, the texture mapper unit according to embodiments of the technology described herein may include additional intersection testing circuit (hardware), which is in an embodiment provided in parallel with the texturing (filtering) unit, and operable to perform the ray-node intersection testing.

The programmable execution unit can then use the result of the intersection testing for the node to determine which node(s) of the ray tracing acceleration data structure should be tested next, and so on, to thereby determine the geometry that is potentially intersected by the ray. For instance, where the texture mapper determines that the ray intersects a volume of a given node, and returns a result indicating this, the traversal operation should then move on to testing the next (e.g. child) nodes in the acceleration data structure, etc., down to the level of the end nodes of the acceleration data structure.

The shader program thus in an embodiment controls the traversal operation, e.g. to manage which nodes should be tested (next), and so on, with the texture mapper unit being messaged at appropriate points during the traversal operation as and when required.

For any end nodes which it is determined contain geometry that is potentially intersected by the ray the programmable execution unit can then execute further programs to determine whether there is any geometry that is actually intersected by the ray (and then further processing a sampling position corresponding to the ray accordingly, such as, and in an embodiment, and as will be discussed further below, by casting a further ray for the sampling position and/or rendering (shading) the sampling position).

In embodiments, the texture mapper unit may additionally, or alternatively, be operable and configured to perform the subsequent ray-primitive intersection testing for a ray and the individual units of geometry (primitive e.g. triangles) represented by an end node of the ray tracing acceleration data structure. Again, this can be implemented in a similar fashion as described above, with the texture mapper unit in that case being configured to load in the primitives represented by an end node (or nodes) to be tested, etc.

In that case, in embodiments, the data that is loaded in for the (end) node may comprise a subset of primitives represented by the node in question that are to be used for ray-primitive testing. The texture mapper unit may thus comprise an appropriate intersection testing circuit (hardware) for performing ray-primitive intersection testing. This may be the same circuit that performs the ray-volume intersection testing discussed above, or may be a separate circuit dedicated for the ray-primitive intersection testing.

Thus, in embodiments, after the texture mapper has performed the ray-node (volume/primitive) intersection testing, the result of the intersection testing (e.g. hit/miss) is then returned to the shader program for further processing.

Because the texture mapper unit may not be dedicated for performing such intersection testing (since it is also arranged to perform normal texturing operations), there may still be situations where it is better, e.g. more efficient, for at least some of the intersection testing to be performed by a suitable shader program, e.g., and in particular, for complex cases, e.g. where a ray is determined to intersect an edge. In that case, the result that is returned by the texture mapper may be an indication that the texture mapper unit has not been able to determine the ray-node (volume/primitive) intersection, to then trigger a shader program to perform the intersection testing for that node.

Thus, in embodiments, the texture mapper unit is operable to determine whether it is able to perform the ray-node intersection testing, and when the texture mapper unit determines it is unable to perform the ray-node intersection testing, the texture mapper unit returns a result indicating this to the programmable execution unit to cause the programmable execution unit to execute a program to perform the required ray-node intersection testing.

This may help reduce the complexity (area) of the intersection testing circuit provided within the texture mapper unit (where one is provided). That is, the texture mapper unit may be used to handle only some, but not all, of the intersection testing, with the operation returning to the programmable execution unit to perform more complex intersection testing.

However, other arrangements would be possible, and the processing can be shared between the programmable execution unit and the texture mapper unit in any suitable and desired manner, as will be explained further below.

For instance, in some embodiments, the texture mapper unit may be used to load in the required data for testing a node, without any attempt to perform intersection testing, with the intersection testing then being performed by the programmable execution unit. In that case, there may be no need to add intersection circuitry to the texture mapper unit, and the operation according to this embodiment can be implemented in an existing more 'conventional' texture mapper by providing a suitable instruction to trigger such operation.

The result that is returned by the texture mapper unit in that case may then be the node (volume) data (which may be analogous to the texture mapper unit returning an unfiltered texture).

Thus, in embodiments, in response to receiving an appropriate message (instruction) from the programmable execution unit, the texture mapper unit is caused to load in from memory a set of data for a node of the acceleration data structure (e.g. a set of volumes and/or primitives represented by the node in question), and then return this data to the programmable execution unit for further processing.

In other embodiments, the texture mapper unit could be arranged to perform the full ray tracing traversal operation, and in that case the texture mapper may return an indication of geometry which is intersected (which may be analogous to the texture mapper unit returning a filtered texture). In that case, the texture mapper unit may include further circuitry to facilitate controlling the overall traversal operation. Various other arrangements would be possible.

When the ray tracing operation to determine the geometry intersections for a ray is finished, in whichever manner this is performed between the programmable execution unit and the texture mapper unit, the graphics processor may then execute further shading programs to determine the appearance of the sampling position for which the ray was cast. As part of that the graphics processor may perform 'normal' texturing operations, as desired. Thus, in embodiments, the ray tracing operation also uses the texture mapper unit to perform normal texturing operations during the shading (rendering) of the sampling position for which the ray was cast.

This all then has the effect of performing some of the ray tracing operation, namely a part of the ray tracing operation using an acceleration data structure, e.g., and in an embodiment, a traversal operation (as well as any normal texturing operations that may be performed), using the texture mapper unit (hardware/circuit), rather than, e.g., performing that operation using more general programmable processing circuitry that is programmed to perform the required operation.

For example, in embodiments, this can then lead to accelerated and more efficient traversing of the ray tracing acceleration data structures, as compared, for example, to arrangements in which that is done by executing appropriate programs using a programmable processing circuit (which may be relatively inefficient, e.g. due to poor memory access locality for execution threads corresponding to different rays).

The effect of this then is that the ray tracing acceleration data structure traversal process (and correspondingly the overall ray tracing rendering process) can be performed more efficiently, thereby facilitating, for example, performing ray tracing and/or improved ray tracing, e.g. on devices whose processing resources may be more limited.

Thus, the Applicants have recognised the texture mapper unit is already available and suitable for processing such data structures that may be required to be processed during the ray tracing (e.g. traversal) operation, such that the ray tracing operation can advantageously utilise the texture mapper unit (hardware/circuit) to perform one or more processing operations for the ray tracing operation, without requiring significant hardware changes to the texture mapper unit (if any), and therefore with relatively little increase in silicon area.

Subject to the requirements of the technology described herein the texture mapper unit may therefore otherwise be configured as desired, e.g. in the normal way for a texture mapper unit, with its existing hardware/circuit being re-purposed for performing such ray tracing traversal operations.

(Thus, in addition to performing the processing operations for the ray tracing operation in the manner of the technology described herein, the texture mapper unit can, and in an embodiment does, also perform (normal) texturing operations during the overall graphics processing process and/or for different graphics processing operations.)

The Applicants have found that this then has the advantage of being able to accelerate the ray tracing process as compared, e.g., to performing the entirety of that operation using more general programmable processing circuitry, but on the other hand with a relatively minimal increased cost for the graphics processor, e.g. in terms of the silicon area, as compared, e.g., to providing dedicated circuitry for accelerating the entirety of the ray tracing process, as the existing texture mapper unit (hardware/circuit) can be re-purposed to this effect.

Therefore, the technology described herein provides various benefits compared to other possible approaches.

The graphics processor can comprise any suitable and desired graphics processor that includes a programmable execution unit (circuit).

The programmable execution unit can be any suitable and desired programmable execution unit (circuit) that a graphics processor may contain. It should be operable to execute graphics shading programs to perform graphics processing operations. Thus the programmable execution unit will receive graphics threads to be executed, and execute appropriate graphics shading programs for those threads to generate the desired graphics output.

There may be a single or plural programmable execution units. Where there are plural programmable execution units, each execution unit can in an embodiment operate in the manner of the technology described herein.

The graphics processor in the technology described herein also includes a texture mapper unit. For instance, a shader program being executed by the programmable execution unit may include instructions to perform graphics texturing operations. When the programmable execution unit encounters such an instruction in a shader program that it is executing for a thread, the programmable execution unit sends an appropriate request to the texture mapper to perform the required graphics texturing operation.

Thus, in embodiments, an appropriate texturing operation instruction will be included in a shader program to be executed by the programmable execution unit, and be recognised by the programmable execution unit as a texturing operation instruction, with the programmable execution unit then operating to send appropriate instructions to the texture mapper to perform the texturing operation (and return the result of the texturing operation to the programmable execution unit for further processing and/or other use).

The texture mapper unit should be, and is in an embodiment, a (substantially) fixed-function hardware unit (circuit) that is configured to perform texturing operations. The texture mapper unit should thus comprise an appropriate fixed function circuit or circuits to perform the required operations, although it may comprise and have some limited form of configurability, in use, e.g. if desired.

The texture mapper unit may have any functional units/circuits as desired, e.g. that a texture mapper unit may normally have.

As mentioned above, a texturing operation request, e.g. texturing operation instruction, in an embodiment indicates that a texturing operation is to be performed, and the texture(s) (the set of texture data values) to be used for the texturing operation. In an embodiment, the texturing operation request (e.g. instruction) indicates where the texture data for the texturing operation is stored, with the texture mapper then fetching the texture data from where it is stored in response to the instruction. The texture mapper in an embodiment then performs the indicated texturing operation on the indicated texture data values.

Thus, in an embodiment, the texture mapper includes data processing circuitry operable to receive a texturing operation instruction, and to, in response to receiving the texturing operation instruction, control the texture mapper to fetch texture data values on which the texturing operation is to be performed, and to cause the texture mapper to perform the texturing operation on the fetched set of texture data values.

The texture mapper (texture mapping apparatus) can perform the required texture mapping operations in any suitable and desired manner, and, correspondingly, can include any suitable and desired circuits, units and stages for performing texture mapping operations.

In an embodiment, the texture mapper at least comprises a data fetching circuit (circuitry) that is operable to (configured to) fetch from memory texture data values to be used when performing a texturing operation. In embodiments, the data fetching circuit (circuitry) can (and is) correspondingly also used to fetch from memory data values to be used when performing processing operations during a ray tracing traversal operation, in a similar fashion.

The texture mapper in an embodiment also comprises a texture filtering circuit (circuitry) that is operable to (configured to) perform a texturing operation using texture data values fetched by the data fetching circuit.

The data fetching circuit may comprise any desired and suitable processing circuit (circuitry) operable to perform the required functions. This circuit may be in the form of one or more dedicated hardware elements that are configured appropriately, or it may comprise programmable processing circuitry that has been programmed appropriately.

The texture mapper's data fetching circuit may further comprise local storage operable to store input texture data values locally to the texture mapper. For example, the local storage unit may comprise a local cache. The cache may be operable to store, and may store, any desired and suitable amount of texture data.

Correspondingly, when the texture mapper is being used as part of a ray tracing operation, the cache may be operable to store, and in an embodiment does store, data for the ray tracing traversal operation (e.g. node (volume) data, primitive data, etc.).

The data fetching circuit may be operable to, in response to a request to use data values for an operation, first determine whether or not those data values are already stored locally (have already been fetched from memory), e.g. are in the local cache. When those data values are not already stored locally (have not previously been fetched from memory and, e.g. are not cached), then the texture data fetching circuit may fetch those data values from memory. The fetched data values may then be stored by the texture data fetching circuit in the local cache (e.g. for future re-use by the texture filtering circuit) and/or in other local storage (e.g. for immediate use by the texture filtering circuit). However, when the data values are already stored locally (have already been fetched from memory and, e.g. are cached), then the texture mapper's data fetching circuit may fetch those data values from the local cache directly, without sending any request out to the main memory system.

In an embodiment, the texture mapper's data fetching circuit comprises a "parking" buffer, that comprises (maintains) a record of pending (outstanding) operations to be performed (e.g. that may still be waiting for data to be fetched from memory). For example, when a texture mapping operation that is in the parking buffer is determined as being ready to be performed, a texture filtering circuit may read and then use the fetched data for the operation.

Likewise, the parking buffer may also be used to handle processing operations for a ray tracing operation, in the same way. Thus, when a processing operation for a ray tracing operation that is in the parking buffer is determined as being ready to be performed, the intersection circuit (where this is provided) may read and then use the fetched data for the operation.

The record of outstanding operations to be performed that is maintained in the parking buffer can take any desired and suitable form.

The parking buffer in an embodiment stores for each entry in the buffer (record) (for each outstanding operation to be performed in the record), appropriate control (state) data for that operation (a "payload record"), such as one or more indicators and other information for the operation that is waiting to be performed, such as meta data needed in order to be able to perform the operation. This information may, for example, indicate the particular data and/or parameters that are to be used for the operation, the particular type of operation that is to be performed (e.g. including whether the operation is a texturing operation or a ray tracing operation such as a ray tracing traversal), etc.

The entry for a pending operation in the record (in the parking buffer) in an embodiment also indicates the data required for the operation that the record (entry) relates to, for example, and in an embodiment, in the form of appropriate addresses (e.g. memory or cache addresses, and in an embodiment cache addresses) where the data that is required is stored.

The texture filtering circuit of the texture mapper can comprise any desired and suitable processing circuit operable to perform the required filtering functions. This processing circuit may be in the form of one or more dedicated hardware elements that are configured appropriately, or it may comprise programmable processing circuitry that has been programmed appropriately. In one embodiment, a dedicated texture filtering circuit (hardware) is used.

The texture filtering circuit may comprise circuitry operable to read texture data values stored locally to the texture mapper (e.g. in the local storage) and then use those data values to perform a texture mapping operation. The texture filtering circuit may further comprise circuitry operable to (e.g. internally) calculate interpolation weight values to be used in a texture mapping operation and use those calculated interpolation weight values to perform a texture mapping operation.

In an embodiment the texture filtering circuit is not used when performing processing operations as part of a ray tracing operation. Thus, as mentioned above, the texture mapper unit in the technology described herein may also comprise additional circuits/circuitry for performing one or more ray tracing operations, as desired.

For instance, the texture mapper unit in embodiments may comprise an intersection testing circuit (unit) that is operable to test an input ray for intersection with a node of a ray tracing acceleration data structure.

In that case the intersection testing circuit (unit) is in an embodiment provided in parallel with the texturing (e.g. filtering) unit, and operable to communicate with the load/store circuit in a similar fashion, e.g. so that both texturing and intersection testing operations can share the same load/store circuitry (but with different data being loaded).

The intersection testing circuit (unit) may comprise any desired and suitable processing circuit operable to perform the required intersection testing. In an embodiment it is in the form of one or more dedicated hardware elements that are configured appropriately, although there may be a degree of re-configurability, if that is desired. Other arrangements would also be possible.

The communication between the texture mapper unit and the programmable execution unit can be facilitated as desired. There is in an embodiment an appropriate communication (messaging) network for passing messages between the various units. This communication (messaging) network can operate according to any desired communications protocol and standard, such as using a suitable interconnect/messaging protocol.

The technology described herein relates to the situation where a frame that represents a view of a scene comprising one or more objects is being rendered using a ray tracing process. In this process, the frame that is being rendered will, and in an embodiment does, comprise an array of sampling positions, and a ray tracing process will be used to render each of the sampling positions so as to provide an output frame (an image) that represents the desired view of the scene (with respective rays that are cast corresponding to and being used when rendering and to render respective sampling positions for the frame).

The technology described herein can be used for any form of ray tracing based rendering.

Thus, for example, the technology described herein can be used for and when a "full" ray tracing process is being used to render a scene, i.e. in which so-called "primary" rays are cast from a view point (the camera) through a sampling position in the image frame to determine the intersection of that ray with objects in the scene, e.g., and in an embodiment, to determine, for each ray, a closest object in a scene that the ray intersects (a "first intersection point" of the ray). The process may involve casting further (secondary) rays from the respective first intersection points of primary rays with objects in the scene, and additionally using the intersection data for the secondary rays in determining the rendering of the sampling positions.

In this case, the operation in the manner of the technology described herein may be, and is in an embodiment, used when and for analysing the intersections of both primary and secondary rays with objects in the scene.

The technology described herein can also be used for so-called "hybrid" ray tracing rendering processes, e.g. in which both ray tracing and rasterisation processes are performed when performing rendering (e.g. in which only some of the steps of a full ray tracing process are performed, with a rasterisation process or processes being used to implement other steps of the "full" ray tracing process). For example, in an exemplary hybrid ray tracing process, the first intersection of each of the primary rays with objects in the scene may be determined using a rasterisation process, but with the casting of one or more further (secondary) rays from the determined respective first intersection points of primary rays with objects in the scene then being performed using a ray tracing process. In this case, the operation in the manner of the technology described herein may be, and is in an embodiment, used when and for analysing the intersections of the secondary rays with objects in the scene.

The ray-tracing based rendering of a frame that is performed in the technology described herein is triggered and performed by the programmable execution unit of the graphics processor executing a graphics processing program that will cause (and that causes) the programmable execution unit to perform the necessary ray tracing rendering process.

Thus, a graphics shader program or programs, including a set (sequence) of program instructions that when executed will perform the desired ray tracing rendering process, will be issued to the graphics processor and executed by the programmable execution unit. The shader program(s) may include only instructions necessary for performing the particular ray tracing based rendering operations, or it may also include other instructions, e.g. to perform other shading operations, if desired.

Subject to the particular operation in the manner of the technology described herein, the execution of the shader program to perform the desired ray tracing process can otherwise be performed in any suitable and desired manner, such as, and in an embodiment, in accordance with the execution of shader programs in the graphics processor and graphics processing system in question.

Thus, the graphics processor (the programmable execution unit of the graphics processor) will operate to execute the shader program(s) that includes a sequence of instructions to perform the desired ray tracing rendering process, for plural, and in an embodiment for each, sampling position, of the frame that is to be rendered.

Correspondingly, when executing the ray tracing shader program, the graphics processor will operate to spawn (issue) respective execution threads for the sampling positions of the frame being rendered, with each thread then executing the program(s) so as to render the sampling position that the thread represents (and corresponds to). The graphics processor accordingly in an embodiment comprises a thread spawner (a thread spawning circuit) operable to, and configured to, spawn (issue) execution threads for execution by the programmable execution unit.

The ray tracing rendering shader program(s) that is executed by the programmable execution unit can be prepared and generated in any suitable and desired manner.

In an embodiment, it or they is generated by a compiler (the shader compiler) for the graphics processor of the graphics processing system in question (and thus the processing circuit that generates the shading program in an embodiment comprises an appropriate compiler circuit). The compiler is in an embodiment executed on an appropriate programmable processing circuit of the graphics processing system.

The compiler (the compiler processing circuit) is in an embodiment part of, and in an embodiment executes on, a central processing unit (CPU), such as a host processor, of the graphics processing system, and is in an embodiment part of a driver for the graphics processor that is executing on the CPU (e.g. host processor).

In this case, the compiler and compiled code will run on separate processors within the overall graphics processing system. However, other arrangements would be possible, such as the compiler running on the same processor as the compiled code, if desired.

The compilation process (the compiler) can generate the ray tracing rendering shader program in any suitable and desired manner, e.g., and in an embodiment, using any suitable and desired compiler techniques for that purpose.

Thus, in an embodiment, the shader program is generated by the compiler, and the compiler is arranged to include within the shader program the instructions that are used in the technology described herein. Other arrangements would, of course, be possible.

When executing the shader program to perform the ray tracing based rendering process, as it is a ray tracing-based rendering process, the performance of that process will include the tracing of rays into and through the scene being rendered, e.g., and in an embodiment, so as to determine how a given sampling position that the ray or rays in question correspond to should be rendered to display the required view of the scene at that sampling position.

In the technology described herein, when the tracing (casting) of a ray to the scene being rendered is required as part of the ray tracing rendering process, the programmable execution unit triggers the texture mapper unit to perform one or more processing operations during a traversal of a ray tracing acceleration data structure for the ray in question.

As discussed above, depending upon the ray tracing rendering process being used (and the stage of the ray tracing rendering process that has been reached for a given sampling position), the ray that is being cast could comprise a primary ray (e.g. from a viewpoint through a sampling position in an image plane into the scene), or a further (secondary) ray, e.g. that has been cast from a determined intersection with geometry by a primary ray, e.g., and in an embodiment, to determine lighting/shadowing and/or reflections, etc.

The operation in the manner of the technology described herein is applicable whatever form of ray is being cast.

In embodiments, the operation in the manner of the technology described herein is applied to groups of plural rays that are performing the ray tracing operation together. In this case, the rays are in an embodiment grouped together based on their similarities to each other, such that "similar" rays will be grouped together for this purpose. Thus rays are in an embodiment grouped for traversing the (same) ray tracing acceleration data structure together based on one or more particular, in an embodiment selected, in an embodiment predefined criteria, such as one or more of, and in an embodiment all of: the starting positions (origins) for the rays; the directions (direction vectors) of the rays; and the range that the rays are to be cast for.

In the technology described herein the texture mapper unit is operable and configured to perform one or more processing operations as part of a ray tracing operation that uses a ray tracing acceleration data structure (e.g. a ray tracing traversal operation). When the programmable execution unit requires the texture mapper unit to perform one or more such processing operations, the programmable execution unit sends a message to that effect to the texture mapper unit.

The message that is sent from the programmable execution unit to the texture mapper unit should, and in an embodiment does, contain information that is required to perform the relevant one or more processing operations for the ray tracing operation.

Thus, as mentioned above, it in an embodiment indicates one or more of, and in an embodiment all of: a descriptor for the ray tracing acceleration data structure that is to be used (e.g. traversed); the origin (originating position (e.g. x, y, z coordinates)) for the ray that is to be tested (e.g. for which the traversal of the ray tracing acceleration data structure is to be determined); the direction of (a direction vector for) the ray that is being used (e.g. to traverse the ray tracing acceleration data structure); and the range (distance) that the ray is to traverse (the (minimum and/or maximum) distance the ray is to traverse into the scene). In an embodiment it also indicates a node (node index) in respect of which the processing operations are to be performed.

At least in the case where the graphics processor includes plural programmable execution units, the message in an embodiment also indicates the sender of the message (i.e. which programmable execution unit has sent the message), so that the result of the processing operations can be returned to the correct programmable execution unit.

The sending of such a message to the texture mapper unit by the programmable execution unit can be implemented and triggered in any desired and suitable manner. In an embodiment, this is achieved by including an appropriate instruction in the ray tracing rendering shader program to be executed by the programmable execution unit that will trigger the execution unit to send an appropriate message to the texture mapper unit (with the execution unit then sending the message when it reaches (executes) the relevant instruction in the shader program).

Thus, in an embodiment, the method of the technology described herein comprises (and the graphics processing system is correspondingly configured to):

issuing to the programmable execution unit of the graphics processor a shader program for execution by the programmable execution unit to perform a ray tracing operation that uses a ray tracing acceleration data structure to determine geometry for the scene that may be intersected by a ray being used for the ray tracing process that includes an instruction to cause the programmable execution unit to issue a message to the texture mapper unit to cause the texture mapper unit to perform one or more processing operations as part of the ray tracing operation that uses a ray tracing acceleration data structure; and the programmable execution unit when executing the shader program, when it reaches the instruction in the shader program, issuing a message to the texture mapper unit to cause the texture mapper unit to perform one or more processing operations for the ray tracing operation.

Such an instruction can be included in a shader program to be executed by the programmable execution unit in any suitable and desired manner and by any suitable and desired element of the overall data (graphics) processing system.

In an embodiment, the instruction is included in the shader program by the compiler (the shader compiler) for the graphics processor. Thus the compiler in an embodiment inserts an instruction at the appropriate point in the ray tracing rendering shader program that is performing the ray tracing.

In an embodiment, such an instruction is included in the ray tracing rendering shader program that is to be executed by the graphics processor by the compiler in response to an appropriate ray tracing indication (e.g. a "trace( )" call), included in the (high level) shader program that is provided by the application that requires the graphics processing. Thus, e.g., and in an embodiment, an application program will be able to include an explicit indication of a need for a ray tracing operation, with the compiler then, in the technology described herein, including appropriate such instructions in the compiled shader program in response to that. It may also be possible for the compiler to include such instructions of its own accord, e.g. in the case where the compiler is able to assess the shader program being compiled to identify when and where to include such instruction or instructions, even in the absence of an explicit indication of that.

In an embodiment, the compiler analyses the shader program code that is provided, e.g. by the application on the host processor that requires the graphics processing, and includes such an instruction or instructions at the appropriate point(s) in the shader program (e.g. by inserting the instruction(s) in the (compiled) shader program).

The technology described herein also extends to and includes such operation of a compiler.

Thus, a further embodiment of the technology described herein comprises a method of compiling a shader program to be executed by a programmable execution unit of a graphics processor that is operable to execute graphics processing programs to perform graphics processing operations;

the method comprising:

including in a shader program to be executed by a programmable execution unit of a graphics processor when rendering a frame that represents a view of a scene using a ray tracing process a set of one or more instructions that when executed by the programmable execution unit will cause the programmable execution unit to perform a ray tracing operation that uses a ray tracing acceleration data structure indicative of the distribution of geometry for a scene to be rendered to determine geometry for a scene to be rendered that may be intersected by a ray being used for the ray tracing operation that uses the ray tracing acceleration data structure; and further including in the shader program an instruction that when executed by the programmable execution unit will cause the programmable execution unit to message a texture mapping unit of the graphics processor to cause the texture mapper unit to perform one or more processing operations for the ray tracing operation, with a result of the one or more processing operations being returned to the programmable execution unit.

A further embodiment of the technology described herein comprises a compiler for compiling a shader program to be executed by a programmable execution unit of a graphics processor that is operable to execute graphics processing programs to perform graphics processing operations;

the compiler comprising a processing circuit configured to:

include in a shader program to be executed by a programmable execution unit of a graphics processor when rendering a frame that represents a view of a scene using a ray tracing process a set of one or more instructions that when executed by the programmable execution unit will cause the programmable execution unit to perform a ray tracing operation that uses a ray tracing acceleration data structure indicative of the distribution of geometry for a scene to be rendered to determine geometry for a scene to be rendered that may be intersected by a ray being used for the ray tracing operation that uses the ray tracing acceleration data structure; and further include in the shader program an instruction that when executed by the programmable execution unit will cause the programmable execution unit to message a texture mapping unit of the graphics processor to cause the texture mapper unit to perform one or more processing operations for the ray tracing operation, with a result of the one or more processing operations being returned to the programmable execution unit.

The generated shader program can then be issued to the programmable execution unit of the graphics processor for execution thereby.

The technology described herein also extends to the operation of the graphics processor itself when executing the shader program.

Another embodiment of the technology described herein comprises a method of operating a graphics processor when rendering a frame representing a view of a scene using a ray tracing process, the graphics processor comprising:

a programmable execution unit operable to execute programs to perform graphics processing operations;

the method comprising:

the programmable execution unit:

executing a shader program to render a frame that represents a view of a scene comprising one or more objects using a ray tracing process, the shader program including a set of one or more instructions to cause the programmable execution unit to perform a ray tracing operation that uses a ray tracing acceleration data structure indicative of the distribution of geometry for a scene to be rendered to determine geometry for a scene to be rendered that may be intersected by a ray being used for the ray tracing operation that uses the ray tracing acceleration data structure; and in response to the programmable execution unit executing an instruction in the shader program to message a texture mapping unit of the graphics processor to cause the texture mapper unit to perform one or more processing operations for the ray tracing operation, the programmable execution unit messaging the texture mapper unit to perform the one or more processing operations.

A yet further embodiment of the technology described herein comprises a graphics processor that is operable to render a frame that represents a view of a scene comprising one or more objects using a ray tracing process, the graphics processor comprising:

a programmable execution unit operable to execute programs to perform graphics processing operations;

wherein the programmable execution unit is configured such that, when the execution unit is executing a shader program to render a frame that represents a view of a scene comprising one or more objects using a ray tracing process, the shader program including a set of one or more instructions to cause the programmable execution unit to perform a ray tracing operation that uses a ray tracing acceleration data structure indicative of the distribution of geometry for a scene to be rendered to determine geometry for a scene to be rendered that may be intersected by a ray being used for the ray tracing operation that uses the ray tracing acceleration data structure, in response to the programmable execution unit executing an instruction in the shader program to message a texture mapping unit of the graphics processor to cause the texture mapper unit to perform one or more processing operations for the ray tracing operation, the programmable execution unit messages the texture mapper unit to perform the one or more processing operations.

As will be appreciated by those skilled in the art, these embodiments of the technology described herein can, and in an embodiment do, include any one or more or all of the optional features of the technology described herein described herein, as appropriate.

Thus, as described above, in response to executing an instruction to cause the programmable execution unit to message the texture mapper unit to perform one or more processing operations for a ray tracing operation, the programmable execution unit will then message the texture mapper unit accordingly, with the message in an embodiment indicating a set of ray parameters defining the ray for which the ray tracing operation is being performed, and in an embodiment also indicating a node (index) in respect of which the processing operations are to be performed. The data fetching circuitry of the texture mapper unit can then receive and process the message to obtain the ray parameters and read in or fetch the descriptor for the ray tracing acceleration data structure appropriately, e.g. in the manner described above. The node data (e.g. the child node volumes (boxes) and/or primitives associated with the node) is in an embodiment then loaded in by the data fetching circuitry, in an embodiment via a cache system of the texture mapper unit.

The texture mapper unit may then perform further processing (e.g. intersection testing) or may simply return the loaded data to the programmable execution unit for further processing.

Moreover, the operation of the texture mapper unit in this way can be (and in an embodiment is) triggered by the inclusion of an appropriate instruction or instructions in the ray tracing shader program, thus reducing the number of instructions in the shader program.

The effect of all of this is therefore to provide a more efficient approach for handling data during ray tracing operations.

The ray tracing acceleration data structures that are used and traversed in the technology described herein can be any suitable and desired ray tracing acceleration data structures that are indicative of (that represent) the distribution of geometry for a scene to be rendered and that can be used (and traversed) to determine geometry for a scene to be rendered that may be intersected by a ray being projected into the scene.

The ray tracing acceleration data structure in an embodiment represents (a plurality of) respective volumes within the scene being rendered and indicates and/or can be used to determine geometry for the scene to be rendered that is present in those volumes.

The ray tracing acceleration data structure(s) can take any suitable and desired form, such as comprising a tree structure, such as a bounding volume hierarchy (BVH) tree. The bounding volumes may be axis aligned (cuboid) volumes. Thus, in one embodiment, the ray tracing acceleration data structure comprises a bounding volume hierarchy, and in an embodiment a BVH tree. However, other forms of acceleration data structure, such as a KD tree, voxels (grid hierarchies), etc., could be used, if desired.

The ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered. In this case, the graphics processor can generate the ray tracing acceleration data structure in any suitable and desired manner, for example by testing geometry defined for the scene against respective bounding volumes, so as to determine the distribution of the geometry in a bounding volume hierarchy for the scene.

It could also or instead be generated by a CPU (e.g. host processor), e.g. based on an indication of geometry for the scene, e.g. in a preliminary processing pass before the scene is rendered. Other arrangements would, of course, be possible.

The ray tracing acceleration data structure can represent and be indicative of the distribution of geometry for a scene to be rendered in any suitable and desired manner. Thus it may represent the geometry in terms of individual graphics primitives, or sets of graphics primitives, e.g. such that each leaf node of the tree structure represents a corresponding subset of the graphics primitives defined for the scene that occupies the volume that the leaf node corresponds to. Additionally or alternatively, the ray tracing acceleration data structure could represent the geometry for the scene in the form of higher level representations (descriptions) of the geometry, for example in terms of models or objects comprising plural primitives.

It would also be possible for a given ray tracing acceleration data structure to represent the geometry in terms of indicating further ray tracing acceleration data structures that need to be analysed. In this case, an initial ray tracing acceleration data structure would, for example, represent further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects.

Thus the ray tracing traversal operation could include transitions between different ray tracing acceleration data structures, such as transitions between different levels of detail (LOD), and/or between different levels of multi-level ray tracing acceleration data structures.

There may also be ray transformations between ray tracing acceleration data structure switches (e.g. such that there is an automatic transition between different ray tracing acceleration data structures with and/or using a transformation of the ray, e.g. described by metadata of or associated with the ray tracing acceleration data structure). For example, a transition between different levels of detail could use an identity transform, and transitions between multi-level ray tracing acceleration data structures could use generic affine transformations of the rays. Other arrangements would, of course, be possible.

During the ray tracing operation, the ray tracing acceleration data structure traversal will be traversed to determine geometry for the scene to be rendered that may be intersected by the ray in question.

The ray tracing acceleration data structure(s) can be traversed for a ray in any suitable and desired manner, e.g., and in an embodiment in dependence upon the form of the ray tracing acceleration data structure that is being traversed. The traversal operation will use the information provided about the ray to traverse the ray tracing acceleration data structure to determine geometry for the scene to be rendered that may be intersected by the ray in question. In an embodiment, the ray tracing acceleration data structure traversal operation traverses and uses the ray tracing acceleration data structure to identify geometry (if any) in volumes of the scene (and that is indicated by the ray tracing acceleration data structure) that the ray passes through.

Thus, the traversal process in an embodiment operates to traverse the ray tracing acceleration data structure to determine for each volume of the scene that the ray passes through in turn, whether there is any geometry in the volume (indicated by the ray tracing acceleration data structure). Thus, the ray tracing acceleration data structure will be traversed based on the position and direction of the ray, to determine whether there is any geometry in the volumes of the scene along the path of the ray (which could, accordingly, then potentially be intersected by the ray). Other arrangements would, of course, be possible.

In an embodiment, the traversal operation traverses the ray tracing acceleration data structure for the path of the ray until a first (potential) intersection with geometry defined for the scene is found for the ray. However, it would also be possible to continue traversal of the ray tracing acceleration data structure after a first (potential) intersection has been found for a ray, if desired.

For example, the ray traversal operation could be (and in an embodiment is) configured and able to discard (ignore) a (potential) intersection and to carry on with the traversal, e.g. depending upon the properties of the geometry for the intersection in question. For example, if a (potentially) intersected geometry is fully or partially transparent, it may be desirable to continue with the traversal (and either discard or retain the initial "transparent" intersection). Other arrangements would, of course, be possible.

The ray tracing acceleration data structure traversal for a ray could comprise traversing a single ray tracing acceleration data structure for the ray, or traversing plural ray tracing acceleration data structures for the ray. Thus, in an embodiment the ray tracing acceleration data structure traversal operation for a ray comprises traversing plural ray tracing acceleration data structures for the ray, to thereby determine geometry for the scene to be rendered that may be intersected by the ray.

Plural ray tracing acceleration data structures may be traversed for a ray e.g. in the case where the overall volume of, and/or geometry for, the scene is represented by plural different ray tracing acceleration data structures.

Similarly, as discussed above, in one embodiment, a ray tracing acceleration data structure that indicates further ray tracing acceleration data structures to be traversed is used. In this case therefore the ray tracing acceleration data structure traversal operation will operate to first traverse an initial ray tracing acceleration data structure for the ray to determine one or more further ray tracing acceleration data structures to be traversed for the ray, and to then traverse those determined one or more ray tracing acceleration data structures for the ray, and so on, until an "end" ray tracing acceleration data structure or structures that provides an indication of geometry for the scene to be rendered is traversed for the ray.

As part of the traversal operation, as described above, the programmable execution unit can message the texture mapper unit to perform one or more processing operations for the traversal operation (e.g. for loading in the acceleration data structure, and optionally performing the intersection testing), with the result then being returned to the programmable execution unit.

Once the ray tracing acceleration data structure traversal operation for a ray has been performed, the determinations of which geometry for the scene may be intersected by a ray are then further processed to determine the actual geometry intersections and the appearance that the sampling position for which the ray was cast should therefore have.

The information that is provided for the (potentially) intersected geometry can take any suitable and desired form, e.g., and in an embodiment, in dependence upon the form of the geometry itself. For example, in the case of a set of primitives (as candidates for intersection), the appropriate primitive identifiers and any associated geometry identifier (e.g. to which they belong) could be returned.

In an embodiment updated position and direction vectors for the ray are also returned by the ray tracing acceleration data structure traversal.

In order to perform the ray-primitive intersection test to determine the actual geometry intersection, and any required subsequent processing, the programmable execution unit may, and in an embodiment does, use further information relating to the geometry (e.g. primitives), such as appropriate attributes of the geometry (e.g. primitives), such as their vertex positions, normals, surface type/materials, etc. This may be needed in order to determine the actual intersection (point), and for performing further processing in relation to the sampling position accordingly.

Thus the process in an embodiment uses information regarding the properties of the geometry (e.g. in terms of its surface properties, the surface it belongs to, etc.). This information can be provided in any suitable and desired manner, but in an embodiment indexes/pointers to data structures where the data relating to the properties of the geometry is stored are used.

In an embodiment, these properties (additional attributes) are fetched by the programmable execution unit as appropriate, once an intersection has been determined (e.g. by executing further program instructions to fetch the required attributes). However, other arrangements would be possible.

In an embodiment, the ray tracing rendering process supports the use of plural different geometry models, e.g., and in an embodiment, in dependence of the distance of the geometry from the viewpoint (camera), and/or from any lighting for the scene, etc., and the ray tracing acceleration data structure traversal returns with the indicated geometry an indication of which one of the different models should be used for the geometry.

The Applicants have recognised that it would also be possible for the traversal for a ray to fail to find any geometry defined for the scene that the ray could potentially intersect, e.g. in the case when none of the volume of the scene that the ray passes through contains any defined geometry for the scene.

In the case that the ray tracing acceleration data structure traversal operation finds that the ray does not traverse any volume that contains defined geometry for the scene, then the ray tracing acceleration data structure traversal circuit in an embodiment returns an appropriate response in that event. In an embodiment, the ray tracing acceleration data structure traversal circuit returns a response indicating that nothing has been intersected by the ray (that no potential intersection has been found) (i.e. that there has been a "miss").

In an embodiment, in response to such a "miss" response from the ray tracing acceleration data structure traversal operation, the programmable execution unit performs an appropriate particular, in an embodiment selected, in an embodiment predefined, "default" operation for further processing for the sampling position in question in response to that event. This could comprise, for example, assuming intersection with a bounding volume or skybox or computing a procedural colour for the background, etc. The programmable execution unit will then shade the sampling position accordingly.

Thus, in the case where there was no geometry for the scene that may be intersected by the ray in question, in an embodiment a particular, in an embodiment selected, in an embodiment predefined, "default" processing operation that is, e.g., and in an embodiment, predefined for use in the event that there is no "active" defined geometry for the scene found to potentially be intersected by the ray in question, is performed.

In this case, the "default" processing operation could, e.g., simply comprise using particular, in an embodiment selected, in an embodiment predefined, sampling position data (a "default" colour value) to be used for a sampling position in the event that there is no active geometry intersected by a ray for a sampling position (and in one embodiment, that is what is done).

In an embodiment, the "default" processing operation that is performed where a ray does not intersect any "actively" defined geometry for the scene comprises using particular, in an embodiment selected, in an embodiment predefined, "default" geometry to be used and considered in that event. In this case, the predefined, default geometry in an embodiment indicates at least a default, predefined surface type for the geometry and/or the position for the geometry. The surface type may, e.g., be predefined as a "bounding" surface that bounds the scene and that is to be used for rays that pass through the scene without intersecting any otherwise defined geometry for the scene.

Thus, in an embodiment, the ray tracing acceleration data structure traversal operates to (and is configured to) determine whether any of the volumes in the scene represented by the ray tracing acceleration data structure traversed by the ray contain any geometry for the scene.

Once the ray tracing acceleration data structure traversal operation has returned the appropriate geometry information for a ray, the programmable execution unit will then, and does then, use the indicated geometry determined by the ray tracing acceleration data structure traversal operation to determine any geometry that is intersected by a ray. Thus the programmable execution unit will itself perform the actual intersection tests and determinations using, and based on, the geometry indicated by the ray tracing acceleration data structure traversal operation.

The ray-primitive intersection determination can use the information returned by the ray tracing acceleration data structure traversal as appropriate and desired. Thus it will, in an embodiment, use the indication of geometry that may be intersected by the ray to test whether the geometry is actually intersected by the ray, together with any other properties, such as surface properties, indicated for the geometry that may affect intersection of the ray or the operation that is required.

It should be noted in this regard that while the programmable execution unit will, and in an embodiment does, use the indicated geometry to determine the geometry that is intersected by a ray, as the ray tracing acceleration data structure traversal operation only returns an indication of geometry that may be intersected by the ray (e.g. that is present in a volume that the ray intersects (pass into/through)), it could be that in fact the ray will not actually intersect any of the indicated geometry. Thus while the determination of any geometry that is intersected by a ray performed by the programmable execution unit may, and typically will, result in the identification of geometry that is actually intersected by the ray, it could be the case that the intersection determination performed by the programmable execution unit will in fact determine that there is in fact no geometry that is intersected by the ray.

In the case that the intersection determination performed by the programmable execution unit determines that there is in fact no geometry that is intersected by the ray (e.g. when the ray tracing acceleration data structure traversal circuit returns a set of primitives, but none of the primitives is actually intersected by the ray), then the programmable execution unit in an embodiment treats that as a ray tracing intersection "miss" (as discussed above for the situation where the ray tracing acceleration data structure traversal does not identify any intersection for a ray), and then performs the appropriate "miss" "default" operation (as discussed above) accordingly.

Once the geometry that the ray will actually intersect (if any) has been determined, then the programmable execution unit performs further processing for the sampling position in the frame that the ray corresponds to in accordance with the (any) geometry for the scene determined to be intersected by the ray.

The further processing for a sampling position that is performed in this regard can comprise any suitable and desired processing for the sampling position as a result of the ray tracing operation for the ray in question, e.g., and in an embodiment, in accordance with and based on any geometry for the scene that was determined to be intersected by the ray.

The further processing for a sampling position that is performed as a result of the ray tracing operation for a ray is in an embodiment determined and selected in accordance with and based on the geometry of the scene that was determined to be intersected by the ray, and/or in accordance with and based on the particular ray tracing-based rendering process that is being performed (e.g. whether the ray tracing process requires the casting of secondary rays (where it is appropriate to do that), and/or the casting of secondary rays of a particular type, or whether the ray tracing-based rendering is intended to be based solely on the first intersection point that is determined). For example, the further processing could be, and in an embodiment is, based on the determined surface type of the geometry that is intersected, and a predefined operation (e.g. in terms of the casting of any secondary rays) for that surface type. Other arrangements would, of course, be possible.

In an embodiment, the further processing for a sampling position that can be (and is) performed in accordance with any geometry for the scene determined to be intersected by a ray corresponding to the sampling position comprises triggering the casting of a further (e.g. secondary) ray into the scene for the sampling position in question.

In an embodiment, the further processing for a sampling position in the frame that a ray corresponds to that can be (and is) performed in accordance with any geometry for the scene determined to be intersected by the ray also or instead (and in an embodiment also) comprises rendering (shading) the sampling position for the frame to generate an output data value (colour value) for the sampling position, e.g., and in an embodiment, to be used to display the view of the scene at the sampling position for the frame in question.

Thus, in an embodiment, the further processing for a sampling position in a frame that a ray corresponds to that is performed comprises one of:

triggering the tracing (casting) of a further (e.g. secondary) ray for the sampling position in question; and rendering (shading) the sampling position so as to provide an output colour value for the sampling position for the frame.

Correspondingly, the technology described herein in an embodiment comprises shading the sampling position based on the intersection, and/or casting further rays into the scene based on the intersection.

As discussed above, which of these operations is performed is in an embodiment based on and in accordance with a property or properties of the geometry that was determined to be intersected by the ray, and the particular ray tracing-based rendering process that is being used.

In the case that the programmable execution unit, in response to determining that there is geometry that is intersected by ray (and the geometry that is intersected by a ray), determines that the sampling position that the ray corresponds to should be shaded (rendered) so as to provide an output colour value for the sampling position for the frame, then the programmable execution unit will execute instructions so as to provide an output, colour value for the sampling position in question.

In embodiments, the shading (rendering) operation comprises applying one or more textures for the sampling position and this is in an embodiment performed using the texture mapper unit, e.g. in the normal way for such texturing operations. Thus, in embodiments, after the traversal operation for a ray has finished, with the texture mapper unit having been used to perform one or more processing operations for the traversal operation for the ray, in response to determining that there is geometry that is intersected by ray (and the geometry that is intersected by a ray), the program may continue by shading (rendering) any geometry that the ray was determined to intersect, and the graphics processor may also use the texture mapper unit during the shading (rendering) to perform texturing operations as desired.

In the technology described herein the texture mapper unit is thus in an embodiment used both to accelerate the ray tracing traversal operation and to perform normal texturing operations. In embodiments, the texture mapper unit can perform both operations in parallel, e.g. for different rays that are being used for the ray tracing operation.

The rendering (shading) of the sampling position can be performed in any suitable and desired manner. In an embodiment, it is performed based on and in accordance with the results of the casting of the ray or rays for the sampling position, and the determined intersected geometry (if any), and/or based on and in accordance with the particular ray tracing-based rendering process that is being performed. For example, the rendering (shading) processing could be, and in an embodiment is, based on the determined surface type of the geometry that is intersected, and a predefined shading operation for that surface type.

The rendering (shading) in an embodiment takes account of all the rays that have been cast for a sampling position and so in an embodiment is based both on the first intersected geometry (and the properties, e.g. surface properties, of that geometry), together with the result of any further (secondary) rays that have been cast for the sampling position, e.g. to determine any lighting, reflection or refraction effects. Other arrangements would, of course, be possible.

In an embodiment, the rendering (shading) of the sampling position is performed once all of the (desired) rays have been cast for the sampling position (and the geometry intersections (if any) for all of the rays to be cast for the sampling position in question have been determined). (As discussed above, the ray tracing process for a given sampling position may comprise both the determination of any geometry that is intersected by a "primary" ray that has been cast from the sampling position itself, together with the determination of geometry, etc., for any secondary rays that have been cast for the sampling position in question, e.g. as a result of an intersection or intersections determined for the primary ray.)

Thus, in an embodiment, once the final results of the rays (the geometry intersections (if any)) have been determined for a sampling position, the programmable execution unit will then render the sampling position in the frame, (at least) in accordance with any geometry for the scene determined to be intersected by rays that have been cast for the sampling position.

Again, this can be done in any suitable and desired manner, and can use any suitable and desired properties, etc., of the geometry, etc., that is determined to be intersected by a ray or rays for the sampling position.

The programmable execution unit can perform and be triggered to perform the determination of any geometry intersected by a ray, and then the appropriate further processing for the sampling position accordingly, in response to the result of a ray tracing acceleration data structure traversal, in any suitable and desired manner. In an embodiment, the programmable execution unit performs these operations, and is triggered to perform these operations, by executing, and being triggered to execute, further processing instructions that will cause the programmable execution unit to perform the required processing operations.

Thus, in an embodiment, once an indication from the ray tracing acceleration data structure traversal operation of geometry that may be intersected by a ray is available, the programmable execution unit is caused to execute further processing instructions, e.g., and in an embodiment, that will cause the programmable execution unit to perform the required processing operations, including determining any geometry intersected by the ray, and then the appropriate further processing for the sampling position in accordance with any geometry for the scene determined to be intersected by the ray.

Thus, when a result from the ray tracing acceleration data structure traversal is available, the programmable execution unit will execute further shader program instructions to perform the desired geometry intersection determination and consequent further processing for the sampling position in question.

In an embodiment, there are different sets of further instructions to be executed in dependence upon the type of geometry that has been determined and is indicated by the ray tracing acceleration data structure, as (potentially) being intersected by a ray. Thus, in an embodiment, there are different (sets) (sequences) of instructions that will be executed by the programmable execution unit in accordance with, and in dependence upon, the particular geometry, and in an embodiment the particular surface type (surface property or properties) of the geometry.

The different sets of instructions to be executed for different types of geometry (e.g. surfaces) could, e.g., be provided as a set of plural different shader programs to be executed (in dependence upon the indicated geometry) (and in one embodiment that is the case), or they could be different sequences (sets) of instructions (e.g. sub-routines) within an overall, larger, shader program that includes sequences (sets) of instructions for each of the different geometry types that are to be treated differently to each other.

Thus, there are in an embodiment a plurality of different "surface processing" routines (shader programs) that will be selected from for execution by the programmable execution unit in accordance with, and based on, the determined geometry that may be intersected by a ray.

Once the ray tracing based rendering process has been completed for a sampling position, then that will, and in an embodiment does, as discussed above, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

The technology described herein can be used for all forms of output that a graphics processor may output. Thus, it may be used when generating frames for display, for render-to-texture outputs, etc. The output from the graphics processor is, in an embodiment, exported to external, e.g. main, memory, for storage and use.

Subject to the requirements for operation in the manner of the technology described herein, the graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics processing system may, for example, include one or more of: a host processor (central processing unit (CPU)), the graphics processor (processing unit), a display processor, a video processor (codec), a system bus, and a memory controller.

The graphics processor and/or graphics processing system may also comprise, and/or be in communication with, one or more memories and/or memory devices that store the data described herein, and/or the output data generated by the graphics processor, and/or store software (e.g. (shader) programs) for performing the processes described herein. The graphics processor and/or graphics processing system may also be in communication with a display for displaying images based on the data generated by the graphics processor.

As will be appreciated from the above, in a graphics processing system that is operable in the manner of the technology described herein, in embodiments of the technology described herein at least, a compiler, e.g. executing on a host processor, will generate and issue to the graphics processor one or more shader programs that when executed will perform the required ray tracing-based rendering operations in accordance with the technology described herein, with the graphics processor (the programmable execution unit of the graphics processor) then executing the programs to perform the ray tracing-based rendering, and as part of that program execution exchanging the messages discussed above with the texture mapper unit of the graphics processor.

The technology described herein also extends to such an overall graphics processing system and the operation of that system.

A further embodiment of the technology described herein comprises a method of operating a graphics processing system including a graphics processor when rendering a frame that represents a view of a scene comprising one or more objects using a ray tracing process, wherein the graphics processor comprises:
the graphics processor comprising:
a programmable execution unit operable to execute programs to perform graphics processing operations; and
a texture mapper unit operable to perform graphics texturing operations in response to requests for graphics texturing operations from the programmable execution unit;
the method comprising:
including in a shader program to be executed by a programmable execution unit of a graphics processor when rendering a frame that represents a view of a scene using a ray tracing process a set of one or more instructions that when executed by the programmable execution unit will cause the programmable execution unit to perform a ray tracing operation that uses a ray tracing acceleration data structure indicative of the distribution of geometry for a scene to be rendered to determine geometry for a scene to be rendered that may be intersected by a ray being used for the ray tracing operation that uses the ray tracing acceleration data structure; and
further including in the shader program an instruction that when executed by the programmable execution unit will cause the programmable execution unit to message a texture mapping unit of the graphics processor to cause the texture mapper unit to perform one or more processing operations for the ray tracing operation, with a result of the one or more processing operations being returned to the programmable execution unit;
the method further comprising, when the programmable execution unit is executing the shader program, in response to the execution unit executing the instruction that will cause the programmable execution unit to message the texture mapping unit to perform one or more processing operations for the ray tracing operation: the programmable execution unit messaging the texture mapper unit to perform the one or more processing operation.

Another embodiment of the technology described herein comprises a graphics processing system comprising a graphics processor that is operable to render a frame that represents a view of a scene comprising one or more objects using a ray tracing process, the graphics processor comprising:
a programmable execution unit operable to execute programs to perform graphics processing operations; and
a texture mapper unit operable to perform graphics texturing operations in response to requests for graphics texturing operations from the programmable execution unit; and
the graphics processing system further comprising:
a processing circuit that is configured to:
include in a shader program to be executed by a programmable execution unit of a graphics processor when rendering a frame that represents a view of a scene using a ray tracing process a set of one or more instructions that when executed by the programmable execution unit will cause the programmable execution unit to perform a ray tracing operation that uses a ray tracing acceleration data structure indicative of the distribution of geometry for a scene to be rendered to determine geometry for a scene to be rendered that may be intersected by a ray being used for the ray tracing operation that uses the ray tracing acceleration data structure; and
further include in the shader program an instruction that when executed by the programmable execution unit will cause the programmable execution unit to message a texture mapping unit of the graphics processor to cause the texture mapper unit to perform one or more processing operations for the ray tracing operation, with a result of the one or more processing operations being returned to the programmable execution unit;

wherein the programmable execution unit is configured such that, when the execution unit is executing a shader program to render a frame that represents a view of a scene comprising one or more objects using a ray tracing process, the shader program including a set of one or more instructions to cause the programmable execution unit to perform a ray tracing operation that uses a ray tracing acceleration data structure indicative of the distribution of geometry for a scene to be rendered to determine geometry for a scene to be rendered that may be intersected by a ray being used for the ray tracing operation that uses the ray tracing acceleration data structure, in response to the programmable execution unit executing an instruction in the shader program to message a texture mapping unit of the graphics processor to cause the texture mapper unit to perform one or more processing operations for the ray tracing operation, the programmable execution unit messages the texture mapper unit to perform the one or more processing operations.

As will be appreciated by those skilled in the art, these embodiments of the technology described herein can, and in an embodiment do, include any one or more or all of the optional features of the technology described herein described herein. For instance, the ray tracing operation that uses the ray tracing acceleration data structure is in an embodiment a ray tracing traversal operation comprising traversing the ray tracing acceleration data structure to determine geometry for a scene to be rendered that may be intersected by the ray, e.g. in the manner described above.

Thus, the instruction that cause the programmable execution unit to message the texture mapper unit may be any suitable instruction, e.g. as described above. For example, this instruction may, and in an embodiment does, cause the texture mapper unit to fetch node data for a node of the ray tracing acceleration data structure for performing intersection testing against the node. The instruction may also, and in some embodiments does, cause the texture mapper unit to perform the desired ray-node intersection testing, as described above. Various other arrangements would be possible.

It will be appreciated by those skilled in the art that all of the described embodiments of the technology described herein can, and in an embodiment do, include, as appropriate, any one or more or all of the optional features of the technology described herein described herein.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, and units of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CD ROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Embodiments of the technology described herein will now be described by way of example only and with reference to the accompanying drawings.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
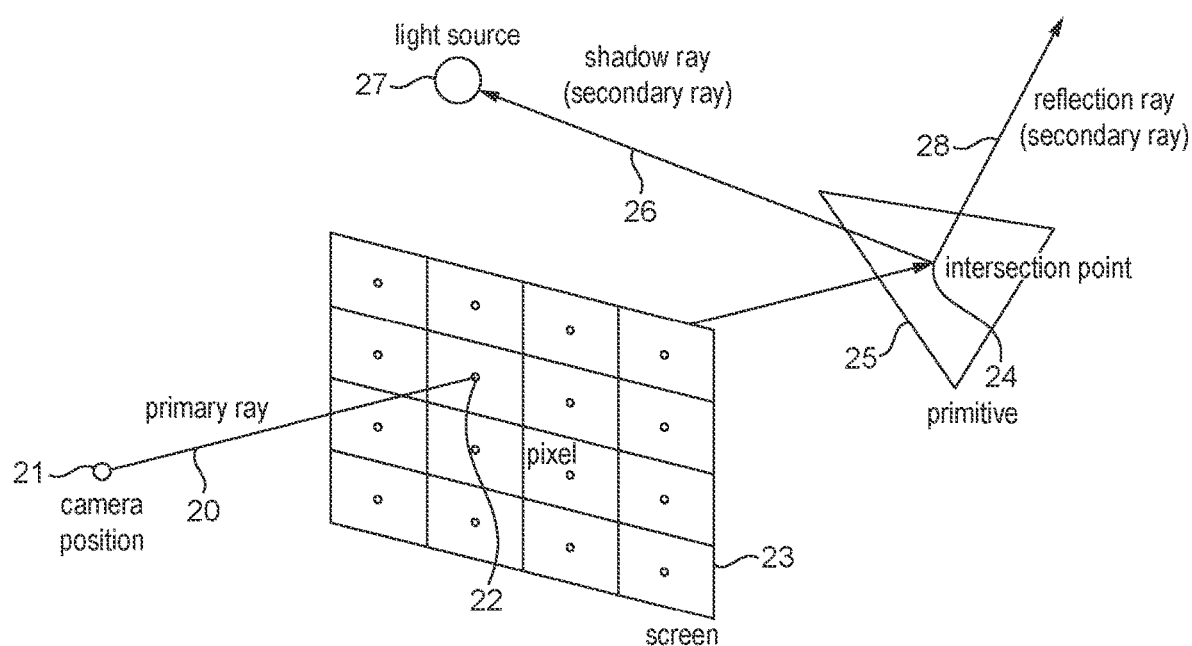
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive, in the scene is identified. This first intersection will be with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-)volumes in the overall volume of the scene (that is being considered). In the present embodiments, ray tracing acceleration data structures in the form of Bounding Volume Hierarchy (BVH) trees are used (although other forms of acceleration data structure could also or instead be used, if desired).

Figure 3:
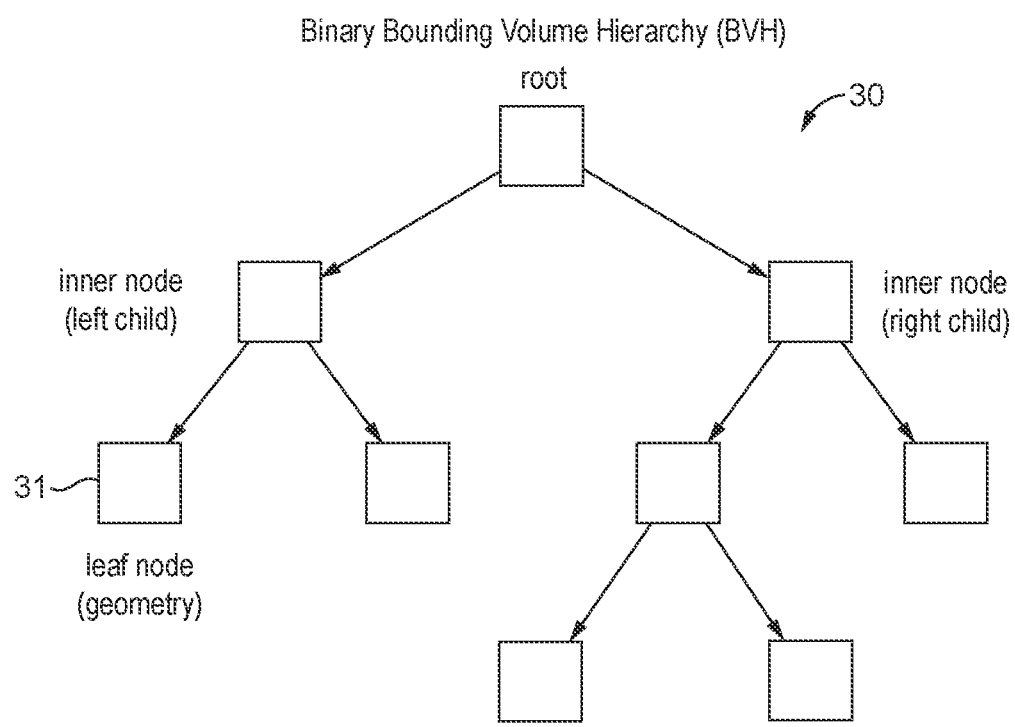
FIG. 3 shows an exemplary ray tracing acceleration data structure.

FIG. 3 shows an exemplary binary BVH tree 30, constructed by enclosing the complete scene in an axis-aligned bounding volume (AABV), e.g. a cube, and then recursively subdividing the bounding volume into successive pairs of two sub-AABVs according to any suitable and desired, and, e.g. various, subdivision schemes (e.g. same number of objects per child, based on traversal cost, etc.), until a desired smallest subdivision (volume) is reached.

Thus, each node in the BVH tree 30 will have a respective volume of the scene being rendered associated with it, with the end, leaf nodes 31 each representing a particular, non-overlapping, smallest subdivided volume of the scene, and any parent node representing, and being associated with, the volume of its child nodes. Each leaf node will also correspondingly be associated with the geometry defined for the scene that falls, at least in part, within the volume that the leaf node corresponds to. The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Whilst FIG. 3 shows a binary tree (where each parent node has two child nodes), the technology described herein may also use wider tree structures, e.g. with each parent node having up to six child nodes, and in some examples this is the case. Other arrangements would of course be possible.

Figure 4:
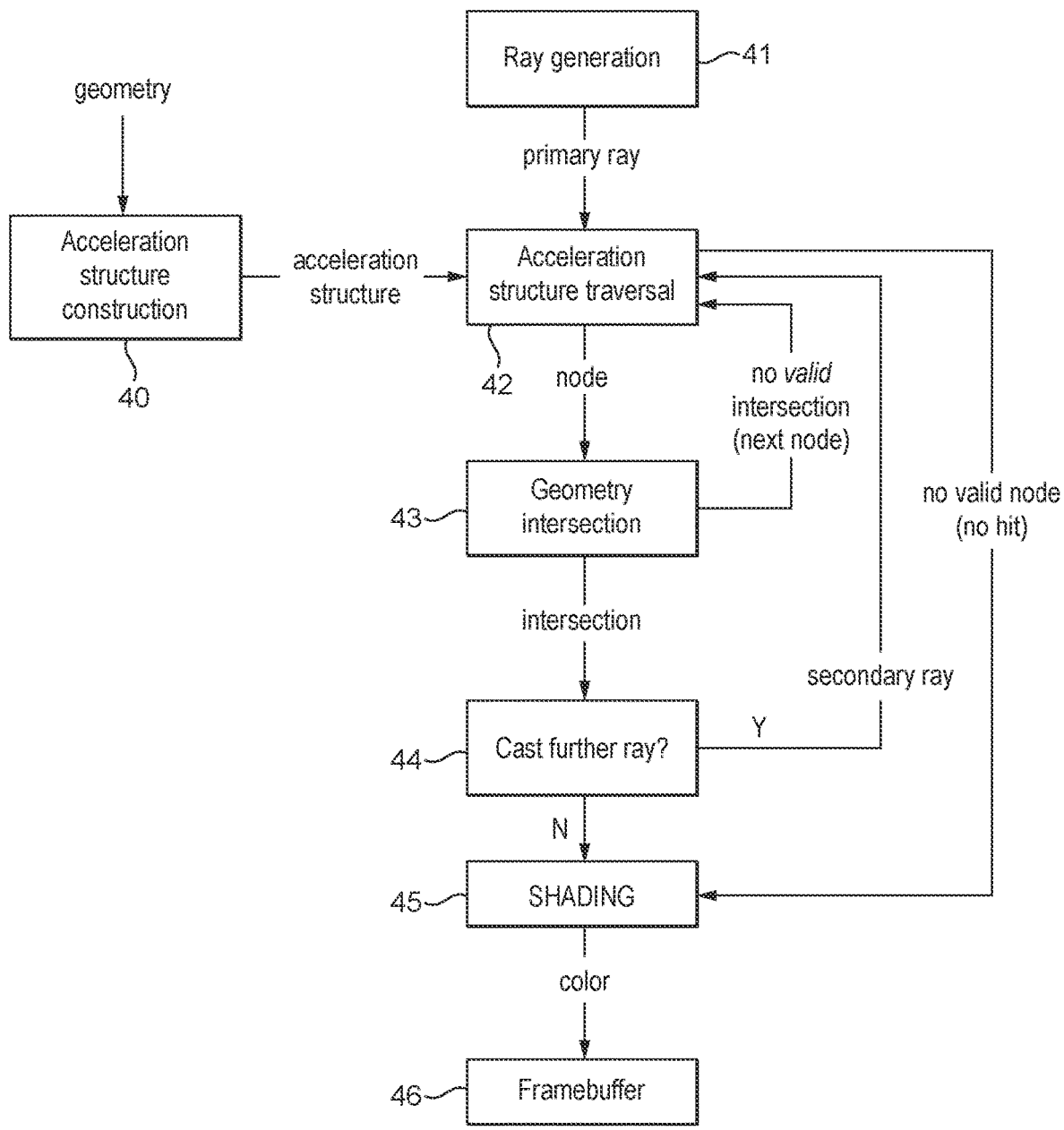
FIG. 4 is a flow chart illustrating an embodiment of a full ray tracing process.

FIG. 4 is a flow chart showing the ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used. Thus, as shown in FIG. 4, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc. The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 5:
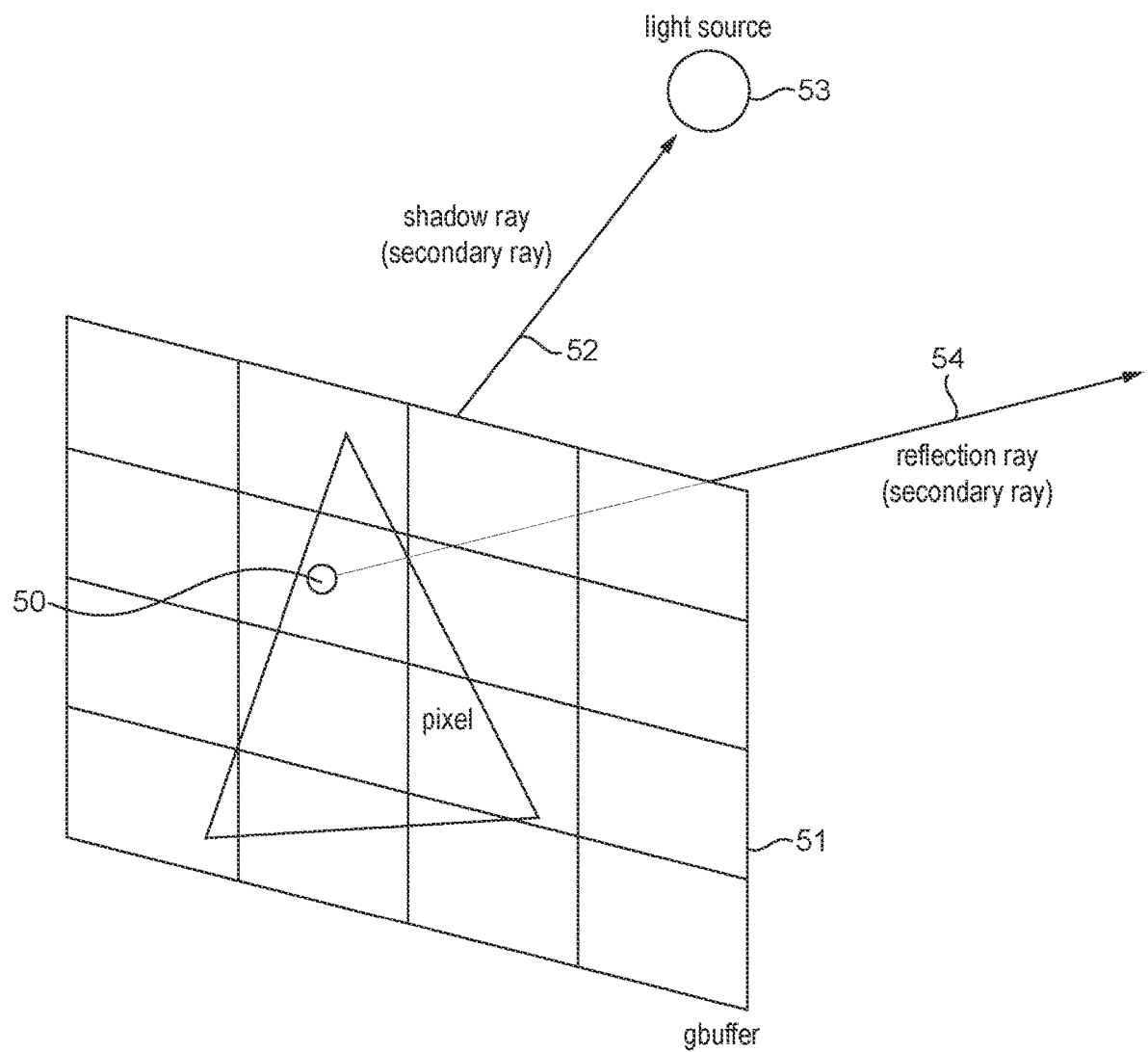
FIG. 5 is a schematic diagram illustrating a "hybrid" ray tracing process.

FIG. 5 shows an alternative ray tracing process which may be used in embodiments of the technology described herein, in which only some of the steps of the full ray tracing process described in relation to FIGS. 3 and 4 are performed. Such an alternative ray tracing process may be referred to as a "hybrid" ray tracing process.

In this process, as shown in FIG. 5, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 4, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4, based on the shading colour determined for the sampling position based on the first intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above with reference to FIGS. 2-4, and in particular to the ray tracing acceleration data structure traversal, geometry intersection, and further processing (steps 42-45 in FIG. 4) performed as part of the ray tracing operation.

Figure 6:
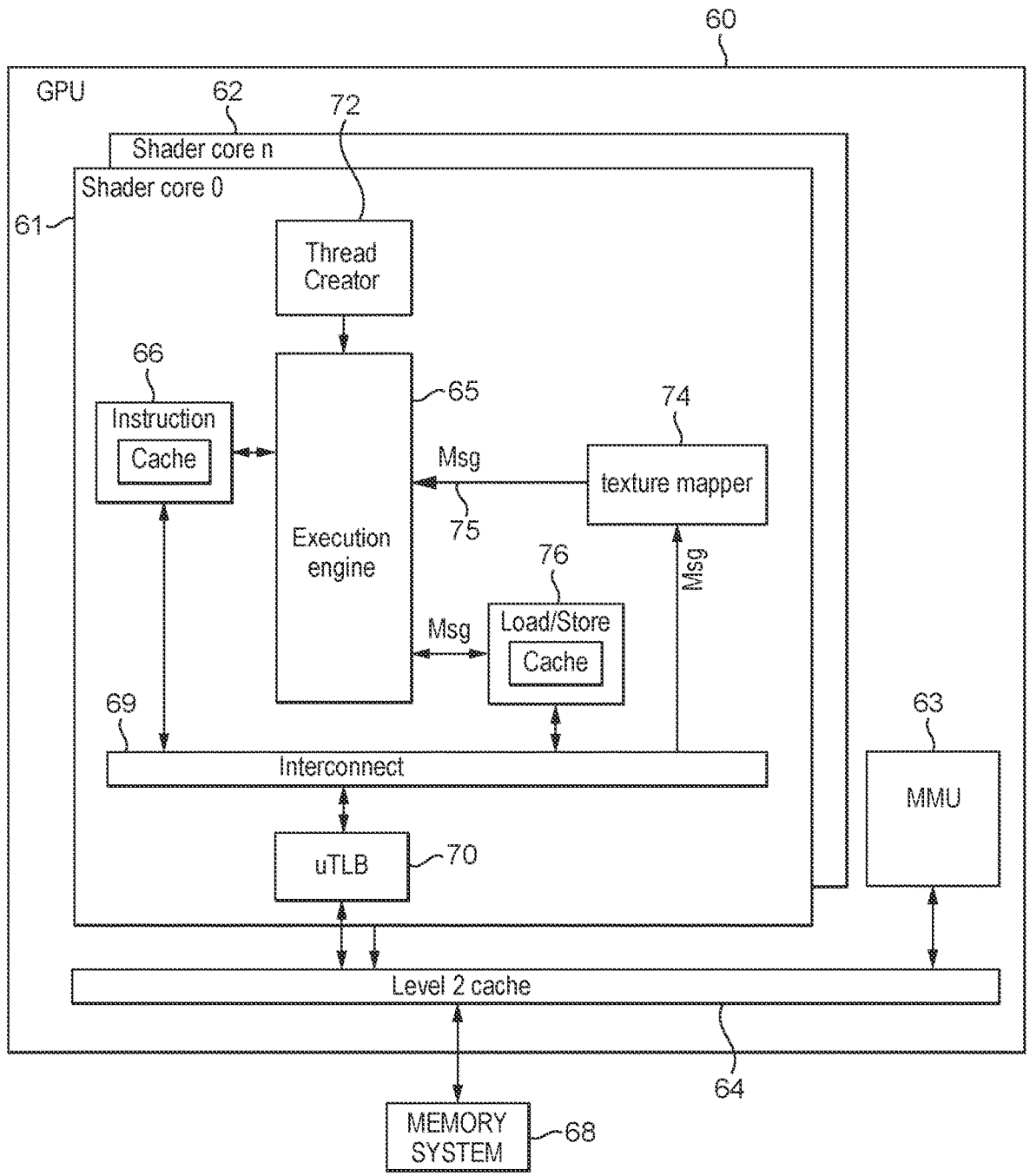
FIG. 6 shows schematically an embodiment of a graphics processor that can be operated in the manner of the technology described herein.

FIG. 6 shows schematically the relevant elements and components of a graphics processor (GPU) 60 of the present embodiments.

As shown in FIG. 6, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller).

FIG. 6 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc. The shader cores will process each "item" by means of one or more execution threads which will execute the instructions of the shader program(s) in question for the "item" in question. Typically, there will be multiple execution threads each executing at the same time (in parallel).)

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 6, the shader core 61 further comprises a number of thread creators (generators) 72 operable to generate execution threads for execution by the programmable execution unit 65 as desired.

As shown in FIG. 6, the shader core 61 also includes a texture mapper unit in the form of texture mapping apparatus 74, which is in communication with the programmable execution unit 65, and which is operable to perform texturing operations.

The texture mapping apparatus 74 includes suitable processing circuitry to follow texturing instructions. In the present embodiments, this processing circuitry is in the form of one or more dedicated hardware elements that are configured appropriately.

Figure 7:
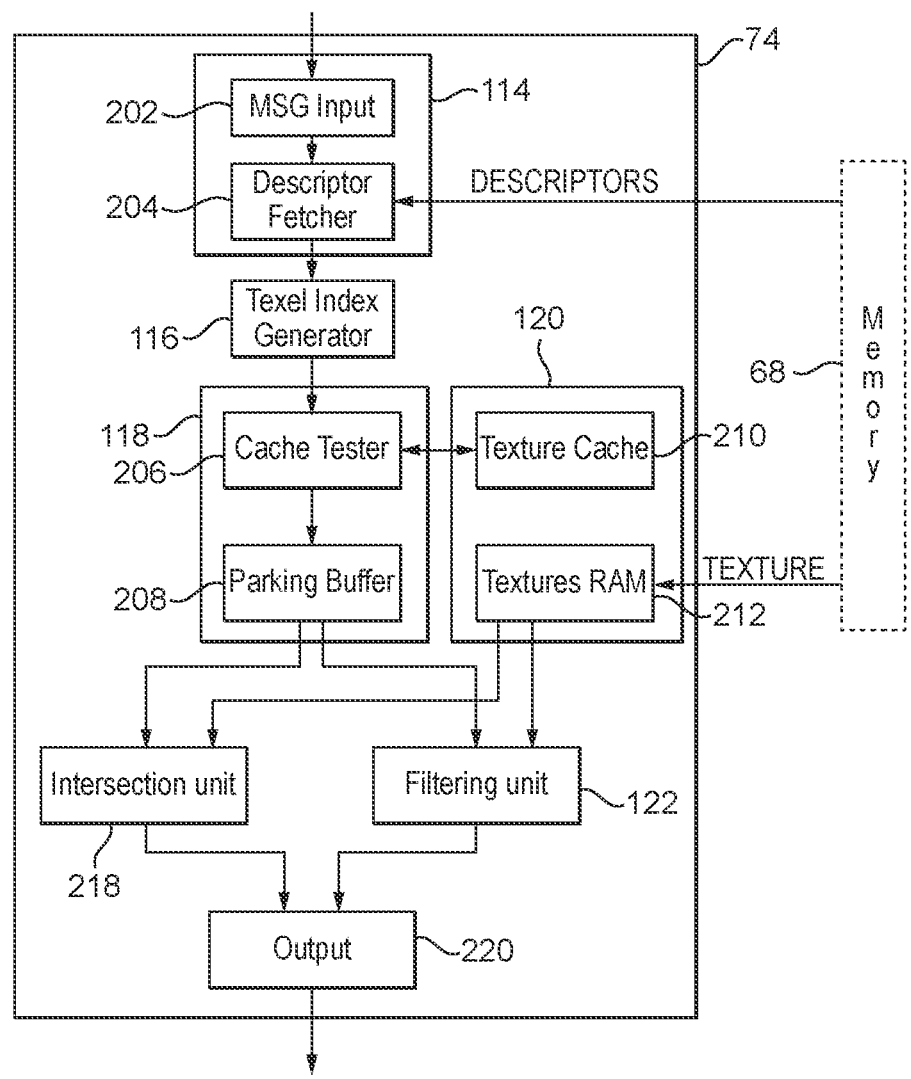
FIG. 7 shows further details of a texture mapper unit of the graphics processor.

FIG. 7 shows the texture mapper (texture mapping apparatus) 74 in further detail.

As is shown in FIG. 7, the input parameter fetching unit 114 of the texture mapping apparatus 74 comprises an instruction message input unit 202 that is operable to receive texturing instructions from the shader cores. The input parameter fetching unit 114 further comprises a descriptor fetching unit 204 that retrieves input parameters (control data) for the texture mapping operation from memory 108.

The input parameters are then passed to the coordinate computation unit 116 where the actual indices for the data values (texels) to be fetched are generated.

As is also shown in FIG. 7, the texture cache lookup unit 118 comprises a cache tester 206 which determines whether the required data (texels) is already cached locally. If the required data is not cached locally, a request is made to fetch the required data from memory 68. The texture mapping operation is then parked in a parking buffer 208 of the texture cache look up unit 118 to await processing (e.g. pending the required data being fetched from memory 68).

As is shown in FIG. 7, the data fetching unit 120 comprises a texture cache 210. The texture cache 210 comprises individually addressable cache lines that can store texture data (texel) values locally to the texture mapping apparatus 74. The data fetching unit 120 further comprises a textures RAM 212 comprising individually addressable RAM banks that can store texture data values locally to the texture mapping apparatus 74.

As is shown in FIG. 7, the texture mapping apparatus 74 further comprises a texture filtering unit 122 that is operable to perform texturing (filtering) operations. For instance, the texture filtering unit 122 may comprises a texture reading unit that receives a processing pass for a texture mapping operation from the parking buffer 208 and reads the required data for that pass from the textures RAM 212. The texture filtering unit 122 may further comprise a weights calculation unit that also receives the processing pass for the texture mapping operation from the parking buffer 208 and calculates interpolation weight values for the texture mapping operation. The texture filtering unit 122 can then multiply the respective data values by their respective weight values and combines the results of the multiplications to provide an output value for the processing pass in question. The filtered textures can then be provided for output accordingly by an output circuit 220 of the texture mapping apparatus.

FIG. 7 accordingly shows an overview of a texture mapping apparatus 74 according to an embodiment of the technology described herein. However, it should again be noted that FIG. 7 is only schematic and that various components and connections have been omitted from that Figure for the sake of clarity.

The operation of the texture mapping apparatus 74 according to the present embodiment when performing normal texturing operations will now be described.

When instructed by the shader core 61 to perform a texture mapping operation, the texture mapping apparatus 74 reads textures from the memory 68 (as required), performs the texture mapping operation, and returns a (e.g. RGB) colour sampled from the texture back to the shader core 104.

As part of this processing, the input parameter fetching unit 114 receives the texturing instruction message from the shader core 61 indicating the texture or textures to be used (e.g. a texture field may be provided that includes a texture descriptor (TXD)), the particular type (e.g. bilinear, trilinear, etc.) of texture mapping operation to perform (e.g. a sampler field may be provided that includes a sampler descriptor (SMD)), and the sampling position coordinates at which to perform the texture mapping operation (e.g. given in a normalized coordinate-system where (0.0, 0.0) is the top-left corner of the texture and (1.0, 1.0) is the bottom-right corner of the texture).

The texture descriptor (TXD) which is used when requesting a texture mapping operation to be performed may, e.g., indicate one or more surface or plane descriptors (SFD) for one or more input arrays or surfaces (textures, images or other arrays) to be used in a texture mapping operation. Each SFD may indicate the parameters for a data array to be used in a texture mapping operation.

The sampler descriptor (SMD) which is used when requesting a texture mapping operation may indicate the filtering method (e.g. bilinear, trilinear, etc.) and other parameters to be used for the texture mapping operation.

The coordinate computation unit 116 then determines, from the sampling position coordinates, the texels (the texel indices) in the texture to be looked up from the data fetching unit 120.

The texture cache lookup unit 118 then checks whether the required texture data (the required texels) is already stored in a cache of the data fetching unit 120 and, if not present, fetches the texture data (the texels) into the texture mapping apparatus 74. For a typical bilinear lookup, texture data from four texels are read from a 2×2 texel region of the texture in memory 108. For a typical trilinear lookup, texture data from two sets of four texels are read from two 2×2 texel regions of respective texture "mipmaps" in memory 108.

The texture filtering unit 122 then reads in the four texels of each bilinear lookup, determines interpolation weight values and computes an interpolated result from the texture data values for the sampling position in question. In the case of trilinear interpolations, the results of two bilinear lookups are combined into a result for the sampling position in question. The result is then output to (returned to) the shader core 61.

Thus, when a texturing instruction is encountered by the execution engine 65 of the shader core 61 (e.g. which may occur during step 45 in FIG. 4), a texturing instruction is sent from the execution engine 65 to the texture mapping apparatus 74, requesting the texture mapping apparatus 74 to perform a texturing operation. After the texture mapping apparatus 74 has finished its texture processing (carrying out the texturing instruction), the final result is sent back to the shader core 61 in a response message for use when shading the fragment in question.

In the present embodiments the texture mapper 74 is also used, in addition to performing the normal texturing operations mentioned above, as an accelerator for the ray tracing process, and in particular to perform one or more processing operations as part of the ray tracing acceleration data structure traversals (i.e. the operation of step 42 of FIG. 4) for rays being processed as part of a ray tracing-based rendering process, in response to messages 75 received from the programmable execution unit 65 of the shader core 21.

To facilitate this, as shown in FIG. 7, the texture mapping apparatus 74 further includes an intersection unit 218 that is provided in parallel with the filtering unit 122 described above, and that is operable to perform ray-volume intersection testing as part of the ray tracing traversal operation. The other circuitry in the texture mapping apparatus 74 is however shared between the intersection unit 218 and filtering unit 122 and available for processing data and operations relating either to texturing operations or ray tracing operations.

Thus, in a corresponding manner as described above for texturing operations, when a ray tracing operation that is to be offloaded to the texture mapping apparatus 74 is encountered by the execution engine 65 of the shader core 61, an appropriate instruction is sent from the execution engine 65 to the texture mapping apparatus 74, requesting the texture mapping apparatus 74 to perform a set of processing operations for the ray tracing operation. The relevant data can then be loaded into the texture mapping apparatus 74 in a corresponding manner as with a texturing operation (but with the data instead relating to the ray tracing operation) and processed accordingly.

After the texture mapping apparatus 74 has finished its processing (carrying out the instruction), the final result is sent back to the shader core 61 in a response message for use by the ray tracing process.

In the present embodiments, the texture mapping apparatus 74 is used to perform processing operations in respect of an individual node in the ray tracing acceleration data structure (the BVH tree 30).

In particular, the texture mapping apparatus 74 is used to fetch the parameters for the node in question. In this way the data-fetch can be (and is) offloaded from the load/store unit 76 that is in communication with the programmable execution unit 65 to the texture mapping apparatus 74, with the texture mapping apparatus 74 then reading the node parameters from memory 68 into the texture cache 210 appropriately, in a corresponding manner to how the texture mapping apparatus 74 would read in texture data.

Offloading the data-fetch to the texture mapping apparatus 74, which has a dedicated data fetching unit 120 that is able to efficiently read in such data, may generally be more efficient than trying to do this using the programmable execution unit 65/load/store unit 76. This also beneficially reduces the number of instructions in the shader program.

In some embodiments, the texture mapping apparatus 74 is further configured such that after it has fetched the parameters for a given node, the texture mapping apparatus 74 then proceeds to compute the intersections between a ray that is being used for the ray tracing traversal operation and the node in question, and to return the result of the intersection testing accordingly in the response message to the programmable execution unit 65.

Figure 8:
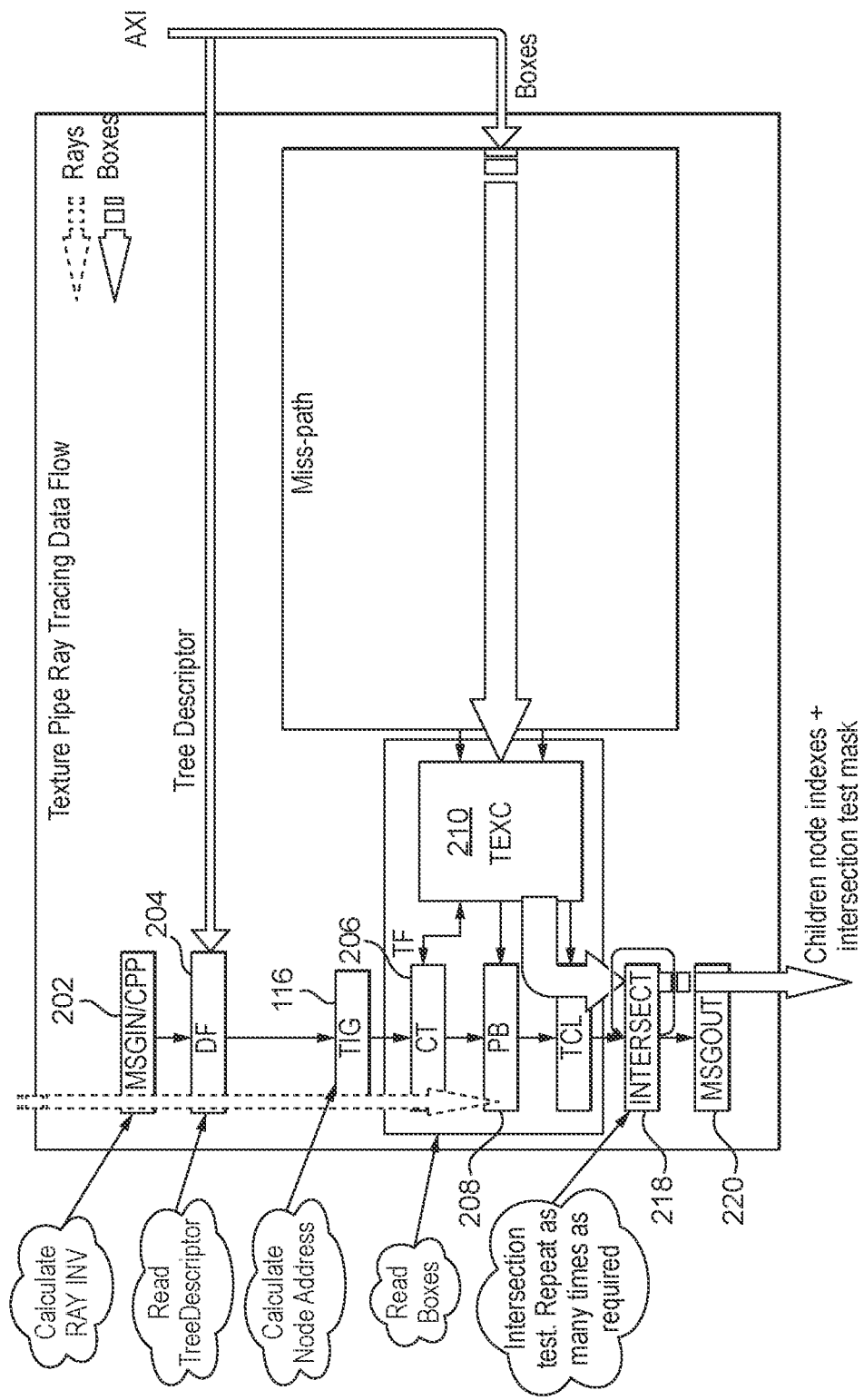
FIG. 8 shows schematically the data flow in the texture mapper unit according to an embodiment of the technology described herein.

FIG. 8 illustrates the data flow in the texture mapping apparatus 74 in this case.

FIG. 8 thus shows the data flow in the texture mapping apparatus 74 in response to the programmable execution unit 65 encountering an instruction that causes the programmable execution unit 65 to message the texture mapping apparatus 74 to perform intersection testing for a given node.

A message 75 is thus sent to the instruction message input unit 202 of the texture mapping apparatus 74 with the message 75 indicating the ray-parameters for the ray in question. For instance, the ray-parameters may be sent to the texture mapping apparatus 74 in a texturing-like message. A descriptor index containing the base-address of the acceleration data structure that is being traversed may also be included as part of the message.

For example, this information may be conveyed using a set of registers allocated for the execution thread that is executing the ray traversal shader program that encountered the instruction. The payload of that message may thus be provided by staging the registers as follows:

```
// Staging-registers:
// 0: ray_dir.x
// 1: ray_org.x
// 2: ray_dir.y
// 3: ray_org.y
// 4: ray_dir.z
// 5: ray_org.z
// 6: ray_len
// 7: node_index
// A warp_constant word will contain a descriptor index for a
TreeDescriptor which contains the base-address of the tree-nodes.
```

In a first step, the message input unit (MSGIN/CPP) 202 can then compute an inverse of the ray direction. To facilitate this, and reduce buffering, the components of the ray_org-vector in this example are spread out over three 'flits' of the message. The computation of the inverse ray direction may, e.g., be performed as follows:

vec3 ray_inv_dir;
ray_inv_dir.x=1.0/ray_dir.x;
ray_inv_dir.y=1.0/ray_dir.y;
ray_inv_dir.z=1.0/ray_dir.z;

The descriptor fetcher (DF) 204 can then read the tree descriptor and the memory address of the node in question can then be computed by the coordinate computation unit (texture index generator, TIG) 116. The computation of the memory address for the tree node to be tested can be done similarly to how a PlaneDescriptor address may be computed for array textures, e.g. as follows
u64_t node address=TreeDescriptor.pointer+node index*64;

The node can then be read in via the texture cache 210 and handled accordingly using the cache tester (CT) 206 and parking buffer 208 in a corresponding manner to how texture data would be handled when performing normal texturing operations.

For instance, if the node data is already in the texture cache 210, it can be loaded directly. Otherwise, the data may be handled appropriately using the miss-path of the texture mapping apparatus.

After a suitable texture cache lookup (TCL), the node data (the child node boxes/volumes) is then passed to the intersection testing unit 218 that performs the required intersection testing for each box/volume associated with the node. For instance, for a node having six child nodes, the intersection testing may be repeated six times. The intersection testing between the ray and the six child node boxes associated with the node being tested may be performed, e.g. as follows:

```
vec3 vmin, vmax;
vmin.x = ray_inv_dir.x < 0.0 ? box.hi.x : box.lo.x;
vmin.y = ray_inv_dir.y < 0.0 ? box.hi.y : box.lo.y;
vmin.z = ray_inv_dir.z < 0.0 ? box.hi.z : box.lo.z;
vmax.x = ray_inv_dir.x < 0.0 ? box.lo.x : box.hi.x;
vmax.y = ray_inv_dir.y < 0.0 ? box.lo.y : box.hi.y;
vmax.z = ray_inv_dir.z < 0.0 ? box.lo.z : box.hi.z;
vec3 tmin = (ray_org + vmin)*ray_inv_dir;
vec3 tmax = (ray_org + vmax)*ray_inv_dir;
float fmin = max( tmin.x, max( tmin.y, tmin.z ) );
float fmax = min( tmax.x, min( tmax.y, tmax.z ) );
// Return true if the box is hit
return fmin < fmax && fmax > 0.0 && fmin < ray_len;
```

A response message is then returned to the programmable execution unit 65 by the output (MSGOUT) 220. The response-message should contain flags indicating which of the child node boxes are hit and also the children node indexes.

This may be indicated in various ways. For instance, one option is to return the fmin for each box, as shown in the example code above. This would always be positive, so it could be set it to a negative value to indicate miss. Various other arrangements would be possible.

The entire operation shown in FIG. 8 that is performed by the texture mapping apparatus 74 can be triggered by including a (single) suitable instruction into the programmable execution unit 65, thus significantly reducing the complexity of the shader program code.

For instance, the pseudo-code below shows a piece of GPU executed code (compiled shader) which would perform the intersection operation with the introduction of a new TEX_RAY_BOX_INTERSECT instruction that causes the programmable execution unit 65 to message the texture mapping apparatus 74 to perform the intersection between a ray and a respective node of the tree structure:

```
TEX_RAY_BOX_INTERSECT intersect_bool, ray_inv_dir, ray_org,
ray_len, node_index
//note that the node_address and box is fetched internally in the texture
mapping apparatus
```

Whilst the above example has been primarily described in terms of testing a ray for intersection with the set of child node volumes (boxes) associated with a node in the tree, it will be appreciated that could also offload the subsequent primitive intersection testing to the texture mapping apparatus 74 in a similar fashion, e.g. by including a corresponding TEX_RAY_TRI_INTERSECT instruction that causes the programmable execution unit 65 to message the texture mapping apparatus 74 to perform the intersection between a ray and a set of primitives represented by a respective end node of the tree structure.

In that case, rather than loading in a set of child node boxes/volumes for testing, the texture mapping apparatus 74 instead loads in the set of primitives represented by the node in question, and then performs appropriate ray-primitive intersection testing.

In FIG. 8, the texture mapping apparatus 74 is thus used to load in the node data and to then perform ray-node intersection testing as required during the traversal operation for a ray.

The result of the intersection testing is then returned to the shader program which controls the traversal appropriately to determine which nodes should be tested next, etc., and then messages the texture mapping apparatus 74 accordingly to trigger ray-node intersection testing for the next node, and so on, until the traversal operation is complete.

However, other arrangements would be possible. For example, in other embodiments, the texture mapping apparatus 74 may be configured to read in the node data for a node, and to then return the node data to the programmable execution unit 65 for further processing, e.g. without the texture mapping apparatus 74 itself performing any intersection testing.

In that case, the intersection testing unit 218 need not be provided (although it may still be).

Figure 9:
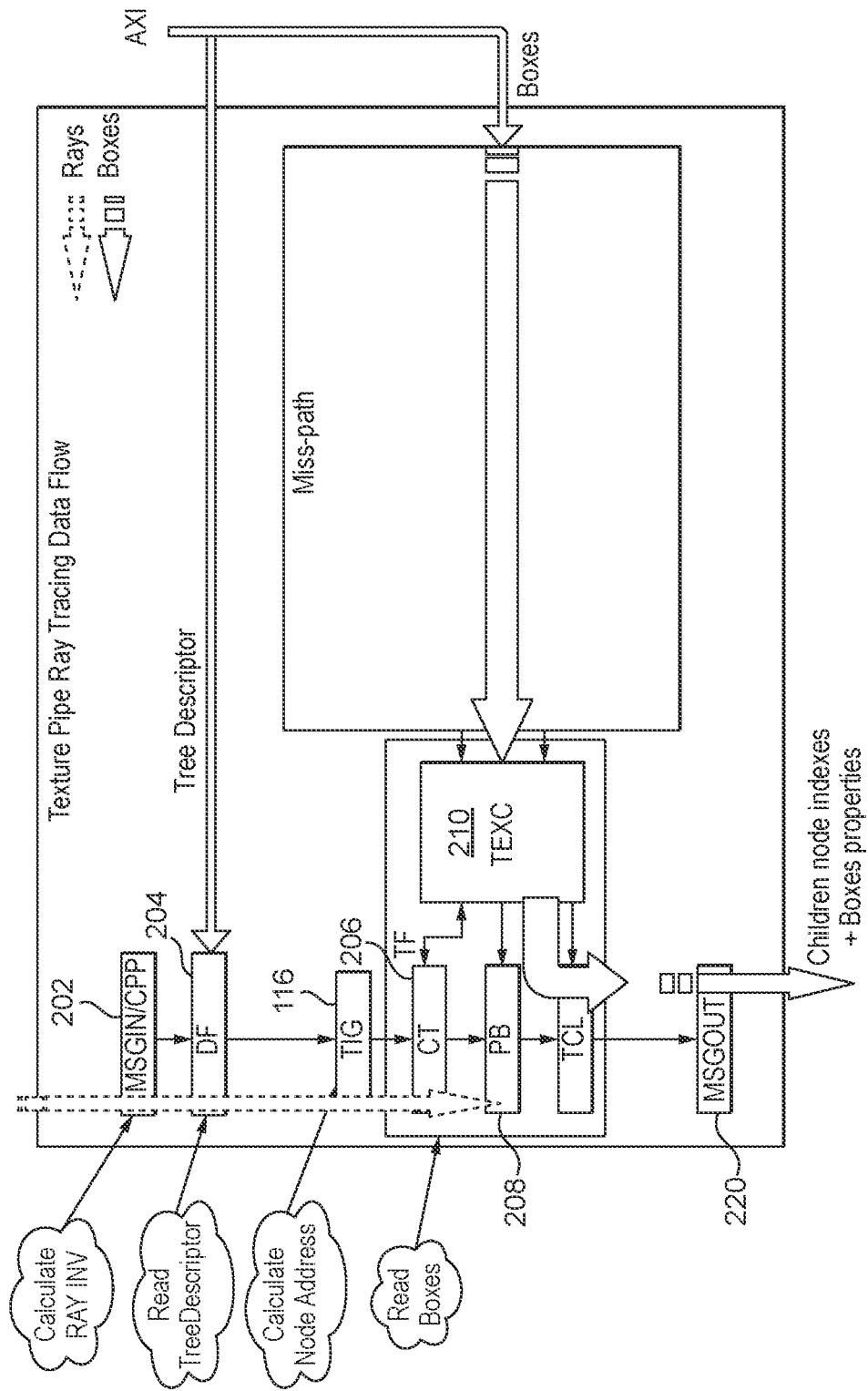
FIG. 9 shows schematically the data flow in the texture mapper unit according to another embodiment of the technology described herein.

FIG. 9 illustrates the data flow in the texture mapping apparatus 74 in that case. As shown in FIG. 9, the general flow is similar to that shown in FIG. 8, as described above. However, in this case, as shown in FIG. 9, after the node data is read in, it is then provided directly to the output circuit (MSGOUT) 220.

The response message in this case should therefore contain the box properties (the child node volumes) and child node indices that are to be used for testing the node in question. The programmable execution unit 65 then performs the intersection testing appropriately using the returned node data. Thus, in FIG. 9, it is only the load operation that is offloaded to the texture mapping apparatus 74.

Again, this can be implemented by including suitable TEX_BOX_FETCH instructions into the ray traversal shader program being executed by the programmable execution unit 65, e.g. as follows:

```
TEX_BOX_FETCH box, node_index
//note that the node_address and box is fetched internally in the texture
mapping apparatus
```

In this case, the actual intersections are then computed by the programmable execution unit 65 executing appropriate "do_intersection" function shader code, e.g. as follows:

```
// Assumption: ray has been computed earlier and is stored in register file
ARITH ray_inv_dir, ray_vec_dir;
//for example executed in the texture mapping apparatus, as above.
TEX_BOX_FETCH box, node_index
//node_address and box is fetched internally in the texture mapping
apparatus
// Do the intersection calculations between the ray and the child boxes in
the tree node.
// Next would be executed 6 times in this example as there are 6 child
boxes and this has been set in the TreeDescriptor as for example
"box_format"
// for example the "box_format" (like the texture format) would encode
how many children a node has, and therefore how many times to perform
the intersect instruction below
ARITH intersect_bool, ray_inv_dir, ray_org, ray_len, vec_box.1
ARITH intersect_bool, ray_inv_dir, ray_org, ray_len, vec_box.2
ARITH intersect_bool, ray_inv_dir, ray_org, ray_len, vec_box.3
ARITH intersect_bool, ray_inv_dir, ray_org, ray_len, vec_box.4
ARITH intersect_bool, ray_inv_dir, ray_org, ray_len, vec_box.5
ARITH intersect_bool, ray_inv_dir, ray_org, ray_len, vec_box.6
```

The "do_intersection" function showed above, would then be used recursively to traverse a tree and it would call itself for every node that intersects. It'd be a recursive function for as many nodes described in the acceleration structure, set in the TreeDescriptor.

An example of code is shown below:

```
for loop (traversing the tree)
    if (do_intersection X)
        for loop (traversing child node X)
            if ( )
                for loop
        if (do_intersection Y)
            for loop (traversing child node Y)
                if ( )
                    for loop ( )
```

Other arrangements would of course also be possible and the processing work may be shared between the programmable execution unit 65 and the texture mapper 74 in any suitable manner, as desired.

For instance, in embodiments, the texture mapping apparatus 74 may be selectively operable either in the manner shown in FIG. 8 or the manner shown in FIG. 9. In particular, the texture mapping apparatus 74 may be able to provide different outputs, e.g. depending on the complexity of the intersection testing that is required.

In particular, in some cases it may be more efficient for the texture mapping apparatus 74 to return the node parameters to the programmable execution unit 65 to perform the intersection testing, e.g. where the intersection testing is expected to be complex, e.g. since the ray intersects an edge of the node volume. In that case, the texture mapping apparatus 74 may operate essentially in the manner shown in FIG. 8 by attempting to perform the intersection testing, but the result may indicate that the intersection testing unit 218 could not determine the intersection, and so the outputted result may be an indication of this together with the node volume.

It would also be possible for the texture mapping apparatus 74 to perform the entire traversal operation, if that was desired. That approach may require additional hardware to be provided in the texture mapping apparatus 74 for controlling the traversal operation.

Figure 10:
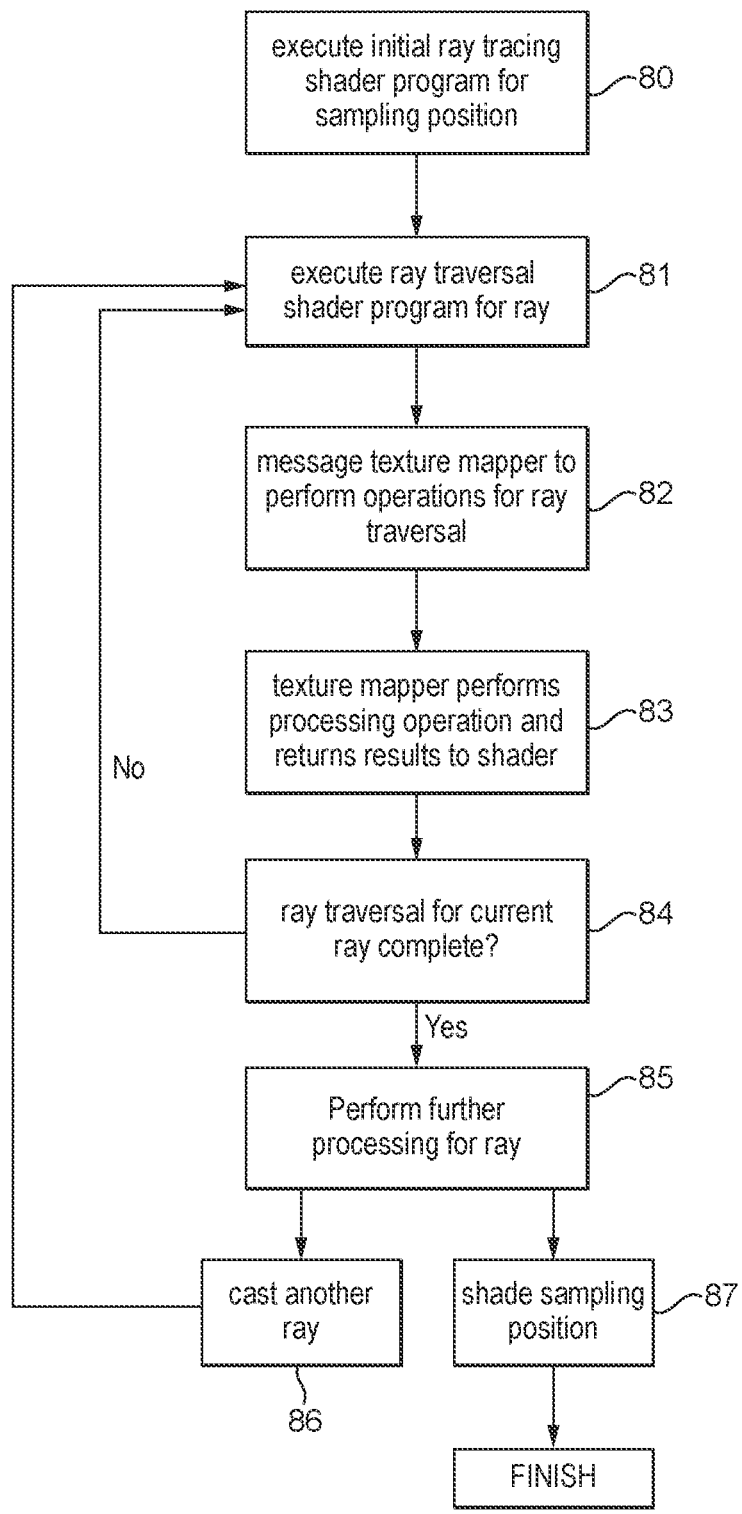
FIG. 10 is a flow chart illustrating an embodiment of the technology described herein.

FIG. 10 is a flowchart showing the operation of a shader core 61 of the graphics processor 60 when performing a ray tracing-based rendering process to render a view of the scene in an embodiment of the technology described herein.

FIG. 10 shows the operation in respect of a given sampling position of the frame being rendered. This operation will be repeated for each sampling position of the frame being rendered, and by each respective shader core that is active and being used to render the frame.

As discussed above, in the present embodiments, sampling positions are rendered by generating respective execution threads for the sampling positions and then executing appropriate shader programs for those threads. Thus, the process will start with the thread creator 72 generating an appropriate execution thread corresponding to the sampling position that is being rendered. The execution thread will then execute an initial ray tracing shader program to perform the ray tracing-based rendering process for the sampling position (step 80).

In the present embodiments, the initial ray tracing shader program that is executed for a sampling position will, inter alia, include one or more "ray traversal" instructions to perform a ray traversal for a ray that is being used for the ray tracing operation. Thus, for a given ray that is being used, the execution thread will execute a corresponding ray traversal shader program (step 81).

As part of this, during the ray traversal shader program, there are included instructions that when executed trigger the programmable execution unit 65 to send a message 75 to the texture mapping apparatus 74 to perform one or more processing operations for the traversal operation for the ray in question. As discussed above, and shown in FIGS. 8 and 9, these operations may, e.g., comprise loading in data for a node that is encountered during the traversal operation, and optionally also performing the ray-node intersection testing.

Thus, as shown in FIG. 10, when, during execution of the ray tracing traversal shader program for a ray (step 81), the programmable execution unit 65 encounters and executes such an instruction (step 82), the programmable execution unit 65 then sends a message 75 to the texture mapping apparatus 74 to trigger the texture mapping apparatus 74 to perform the necessary processing operations for the traversal operation for the ray in question (step 83).

As described above, the message 75 that is sent from the programmable execution unit 65 to the texture mapping apparatus 74 indicates the ray tracing acceleration data structure that is to be traversed; the origin (originating position (x, y and z coordinates)) for the ray for which the traversal of the ray tracing acceleration data structure is to be determined; a direction vector for the ray that is to traverse the ray tracing acceleration data structure; and the (minimum and/or maximum) distance the ray is to traverse into the scene.

As shown in FIG. 10, in response to the message from the programmable execution unit 65, the texture mapping apparatus 74 performs the necessary processing operations for ray tracing traversal and returns an appropriate result to the ray traversal shader program (step 83).

The ray traversal shader program uses the information provided about the ray to traverse the ray tracing acceleration data structure to determine geometry for the scene to be rendered that may be intersected by the ray in question. In the present embodiments, the traversal process operates to traverse the ray tracing acceleration data structure based on the position and direction of the ray, to determine for each volume of the scene that the ray passes through in turn, whether there is any geometry in the volume (indicated by the ray tracing acceleration data structure), until a first (potential) intersection with geometry defined for the scene is found for the ray.

The ray traversal shader program thus uses the result returned from the texture mapping apparatus 74 to continue the ray traversal operation. As shown in FIG. 10, the result returned from the texture mapping apparatus 74 is thus in an embodiment looped back to the shader program, with the shader program messaging the texture mapping apparatus 74 whenever the shader program determines that testing is required for a new node in the ray tracing acceleration data structure (step 84). Other arrangements would, of course, be possible.

The ray tracing acceleration data structure traversal for a ray can comprise traversing a single ray tracing acceleration data structure for the ray, or traversing plural ray tracing acceleration data structures for the ray (e.g. in the case where the overall volume of, and/or geometry for, the scene is represented by plural different ray tracing acceleration data structures, and/or where an initial ray tracing acceleration data structure that indicates further ray tracing acceleration data structures to be traversed is first traversed).

Once the ray tracing acceleration data structure traversal for a ray is complete (step 84—yes), and the ray tracing traversal operation has determined geometry that is (potentially) intersected by the ray, that information is returned to the programmable execution unit 65, for the programmable execution unit to perform further processing for the sampling position in question as a result of, and based on, the result of the determined traversal for the ray (step 85).

The programmable execution unit 65 then performs the desired further processing for the ray accordingly based on any determined geometry intersection (step 85). For instance, the further processing for a sampling position can include the casting of another ray (a secondary ray) for the sampling position in question (step 86) (in which case the traversal operation (steps 81-85) will, as shown in FIG. 10, be repeated for that another (secondary) ray), and, additionally or alternatively, e.g. once all the necessary rays for the sampling position have been cast, shading the sampling position in question (i.e. generate an output colour value for the sampling position in question) (step 87).

Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

As will be appreciated from the above, the ray tracing based rendering process of the present embodiments involves, inter alia, the programmable execution unit 65 of the graphics processor 60 executing appropriate shader programs to perform the ray tracing-based rendering. In the present embodiments, these shader programs are generated by a compiler (the shader compiler) 12 for the graphics processor 60, e.g. that is executing on a central processing unit (CPU), such as a host processor, of the graphics processing system (and in an embodiment as part of the driver 11 operation for the graphics processor), as shown in FIG. 1.

The compiler (driver) will receive the high level ray tracing-based rendering shader program or programs to be executed from the application 13 that requires the ray tracing-based rendering, and then compile that program or programs into appropriate shader programs for execution by the graphics processor, and, as part of this processing, will, as discussed above, include in one or more of the compiled shader programs to be executed by the graphics processor, an appropriate "ray traversal" instruction or instructions to cause the programmable execution unit to send a message to the ray tracing acceleration data structure traversal circuit to perform a ray tracing traversal for the ray. Correspondingly, the compiler will also generate an appropriate set of further "surface processing" shader programs to be executed in response to, and in dependence upon the results of, a ray traversal determined by the ray tracing acceleration data structure traversal circuit.

Figure 11:
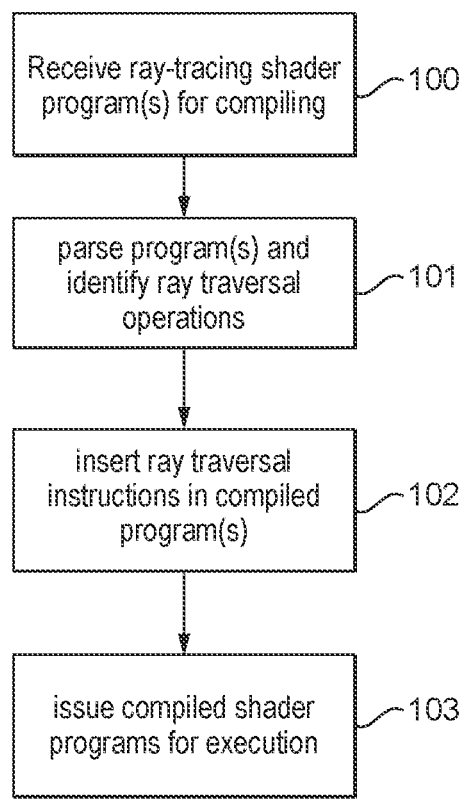
FIG. 11 shows an embodiment of a shader program compilation process.

The compilation process (the compiler) can use any suitable and desired compiler techniques for this. FIG. 11 shows an embodiment of the compilation process.

As shown in FIG. 11, the compiler for the graphics processor will receive a ray tracing-based rendering program or programs for compiling (step 100). The compiler will then analyse the shader program code that is provided, to identify ray traversal operations in that shader program code (step 101), and to correspondingly insert ray traversal instruction(s) at the appropriate point(s) in the compiled shader program(s) (step 102).

As part of this, the compiler will include instructions within the ray tracing traversal shader program to message the texture mapping apparatus 74 to cause the texture mapping apparatus 74 to perform processing operations for the ray tracing traversal operation, as described above.

The compiled shader programs will then be issued to the graphics processor for execution (e.g. stored in appropriate memory of and/or accessible to the graphics processor, so that the graphics processor can fetch the required shader programs for execution as required) (step 103).

It can be seen from the above that the technology described herein, in some embodiments at least, can provide a more efficient process for performing ray tracing-based rendering. This is achieved, at least in embodiments of the technology described herein, by using the texture mapper unit to perform one or more processing operations for the ray tracing acceleration data structure traversals for rays being processed, but with other processing for the ray tracing-based rendering being performed by executing an appropriate shader program or programs using a programmable execution unit of the graphics processor.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor when rendering a frame representing a view of a scene using a ray tracing process,
   the graphics processor comprising:
   a programmable execution unit operable to execute programs to perform graphics processing operations; and
   a texture mapper unit operable to perform graphics texturing operations in response to requests for graphics texturing operations from the programmable execution unit;
   the method comprising:
   when the programmable execution unit is executing a program to perform a ray tracing operation, that uses a ray tracing acceleration data structure indicative of the distribution of geometry for a scene to be rendered to determine geometry for a scene to be rendered that may be intersected by a ray being used for the ray tracing operation, wherein the ray tracing acceleration data structure comprises a plurality of nodes, each node associated with a respective one or more volumes within the scene, the ray tracing acceleration data structure comprising a set of end nodes representing respective subsets of primitives defined for the scene that occupies the volume that the end node corresponds to, and wherein the ray tracing operation for a ray comprises a traversal operation that comprises performing intersection testing to test the ray for intersection with respective volume(s) associated with the nodes of the ray tracing acceleration data structure, in response to the traversal operation requiring a ray to be tested for intersection with a given node of the ray tracing acceleration data structure:
   the programmable execution unit messaging the texture mapper unit as part of the ray tracing operation that uses the ray tracing acceleration data structure to cause the texture mapper unit to load data for the intersection testing for the given node of the ray tracing acceleration data structure;
   loaded data for the intersection testing being provided to the programmable execution unit; and
   the programmable execution unit executing one or more program instructions to perform the intersection testing using the loaded data for the intersection testing.

2. The method of claim 1, wherein the data for the intersection testing for the given node of the ray tracing acceleration data structure is loaded to the texture mapper unit via a cache system of the texture mapper unit.

3. The method of any claim 1, wherein the programmable execution unit is configured to send a message to the texture mapper unit to perform one or more processing operations, the message indicating one or more of: a descriptor for the ray tracing acceleration data structure that is to be used; the origin for the ray that is to be tested; the direction of the ray; the range that the ray is to traverse; and a node in respect of which the processing operations are to be performed.

4. The method of claim 1, wherein the ray tracing process further comprises, after using the ray tracing acceleration data structure to determine which nodes of the ray tracing acceleration data structure represent geometry that may be intersected by a ray, for any nodes that are determined to contain geometry that may be intersected by a ray, the programmable execution unit executing a program to determine which if any geometry represented by the node is intersected by the ray and for any geometry that is intersected by the ray performing further processing operations to determine the appearance of the sampling position for which the ray was cast.

5. The method of claim 4, wherein the further processing operations to determine the appearance of the sampling position for which the ray was cast comprise one or more texturing operations that are performed using the texture mapper unit.

6. A method of compiling a shader program to be executed by a programmable execution unit of a graphics processor that is operable to execute graphics processing programs to perform graphics processing operations;
   the method comprising:
   including in a shader program, to be executed by a programmable execution unit of a graphics processor when rendering a frame that represents a view of a scene using a ray tracing process, a set of one or more instructions that, when executed by the programmable execution unit, will cause the programmable execution unit to perform a ray tracing operation that uses a ray tracing acceleration data structure indicative of the distribution of geometry for a scene to be rendered, to determine geometry for a scene to be rendered that may be intersected by a ray being used for the ray tracing operation that uses the ray tracing acceleration data structure, wherein the ray tracing acceleration data structure comprises a plurality of nodes, each node associated with a respective one or more volumes within the scene, the ray tracing acceleration data structure comprising a set of end nodes representing respective subsets of primitives defined for the scene that occupies the volume that the end node corresponds to, and wherein the ray tracing operation for a ray comprises a traversal operation that comprises performing intersection testing to test the ray for intersection with respective volume(s) associated with the nodes of the ray tracing acceleration data structure;

wherein the set of one or more instructions includes an instruction that, when executed by the programmable execution unit, will cause the programmable execution unit to message a texture mapper unit of the graphics processor to cause the texture mapper unit to load data for the intersection testing for a node of the ray tracing acceleration data structure that the traversal operation requires a ray to be tested for intersection with;

and wherein the set of one or more instructions includes an instruction that, when executed by the programmable execution unit, will cause the programmable execution unit to, when loaded data for the intersection testing is provided to the programmable execution unit, perform the intersection testing using the loaded data for the intersection testing.

7. A graphics processor operable to render a frame representing a view of a scene using a ray tracing process, the graphics processor comprising:

a programmable execution unit operable to execute graphics processing programs to perform graphics processing operations; and a texture mapper unit operable to perform graphics texturing operations in response to requests for graphics texturing operations from the programmable execution unit;

wherein:

the programmable execution unit is operable and configured to, when executing a program to perform a ray tracing operation that uses a ray tracing acceleration data structure indicative of the distribution of geometry for a scene to be rendered to determine geometry for a scene to be rendered that may be intersected by a ray being used for the ray tracing operation, wherein the ray tracing acceleration data structure comprises a plurality of nodes, each node associated with a respective one or more volumes within the scene, the ray tracing acceleration data structure comprising a set of end nodes representing respective subsets of primitives defined for the scene that occupies the volume that the end node corresponds to, and wherein the ray tracing operation for a ray comprises a traversal operation that comprises performing intersection testing to test the ray for intersection with respective volume(s) associated with the nodes of the ray tracing acceleration data structure, in response to the traversal operation requiring a ray to be tested for intersection with a given node of the ray tracing acceleration data structure;

message the texture mapper unit as part of the ray tracing operation that uses the ray tracing acceleration data structure to cause the texture mapper unit to load data for the intersection testing for the given node of the ray tracing acceleration data structure;

and wherein the programmable execution unit is operable and configured to, when loaded data for the intersection testing is provided to the programmable execution unit, execute one or more program instructions to perform the intersection testing using the loaded data for the intersection testing.

8. The graphics processor of claim 7, wherein the texture mapper unit comprises a cache system, wherein the data for the intersection testing for the given node of the ray tracing acceleration data structure is loaded to the texture mapper unit via the cache system.

9. The graphics processor of claim 7, wherein the programmable execution unit is configured to send a message to the texture mapper unit to perform one or more processing operations, the message indicating one or more of: a descriptor for the ray tracing acceleration data structure that is to be used; the origin for the ray that is to be tested; the direction of the ray; the range that the ray is to traverse; and a node in respect of which the processing operations are to be performed.

10. The graphics processor of claim 7, wherein the ray tracing process further comprises, after using the ray tracing acceleration data structure to determine which nodes of the ray tracing acceleration data structure represent geometry that may be intersected by a ray, for any nodes that are determined to contain geometry that may be intersected by a ray, the programmable execution unit executing a program to determine which if any geometry represented by the node is intersected by the ray, and for any geometry that is intersected by the ray performing further processing operations to determine the appearance of the sampling position for which the ray was cast.

11. The graphics processor of claim 10, wherein the further processing operations to determine the appearance of the sampling position for which the ray was cast comprise one or more texturing operations that are performed using the texture mapper unit.

* * * * *